(12) United States Patent
Ito

(10) Patent No.: US 8,908,218 B2
(45) Date of Patent: Dec. 9, 2014

(54) IMAGE FORMING APPARATUS CAPABLE OF EFFICIENTLY AND EFFECTIVELY USING USB CONNECTOR

(75) Inventor: Masayuki Ito, Nagoya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1166 days.

(21) Appl. No.: 12/345,941

(22) Filed: Dec. 30, 2008

(65) Prior Publication Data

US 2009/0180144 A1 Jul. 16, 2009

(30) Foreign Application Priority Data

Jan. 15, 2008 (JP) ................................. 2008-006040

(51) Int. Cl.
| | | |
|---|---|---|
| G06K 15/00 | (2006.01) | |
| G06F 3/12 | (2006.01) | |
| G06F 15/00 | (2006.01) | |
| G06K 1/00 | (2006.01) | |
| G03G 15/00 | (2006.01) | |

(52) U.S. Cl.
CPC .............. G06K 15/00 (2013.01); G03G 15/502 (2013.01); *G03G 2215/00092* (2013.01)
USPC ............................ 358/1.16; 358/1.13; 358/1.9

(58) Field of Classification Search
None
See application file for complete search history.

(56) References Cited

U.S. PATENT DOCUMENTS

| | | | |
|---|---|---|---|
| 4,674,031 A | 6/1987 | Siska | |
| 5,437,032 A * | 7/1995 | Wolf et al. .................... | 718/103 |
| 5,903,848 A * | 5/1999 | Takahashi .................... | 455/512 |
| 6,105,138 A | 8/2000 | Arakawa et al. | |
| 6,415,342 B1 | 7/2002 | Wahl et al. | |
| 6,493,770 B1 | 12/2002 | Sartore et al. | |
| 6,742,055 B2 | 5/2004 | Matsunaga | |
| 7,131,595 B2 | 11/2006 | Wurzburg | |
| 7,330,215 B2 | 2/2008 | Ito | |
| 7,606,949 B2 | 10/2009 | Takaoka | |
| 7,724,390 B2 | 5/2010 | Imai | |
| 2001/0027500 A1 | 10/2001 | Matsunaga | |
| 2002/0044295 A1* | 4/2002 | Tanaka ......................... | 358/1.13 |
| 2003/0056051 A1* | 3/2003 | Burke et al. .................. | 710/302 |

(Continued)

FOREIGN PATENT DOCUMENTS

| | | |
|---|---|---|
| JP | 2000-029818 | 1/2000 |
| JP | 2001-265706 | 9/2001 |

(Continued)

OTHER PUBLICATIONS

Nirsoft USBDeview v1.11 <http://www.nirsoft.net/utils/usb_devices_view.html> dated Dec. 1, 2007.*

(Continued)

*Primary Examiner* — Ming Hon
(74) *Attorney, Agent, or Firm* — Buchanan Ingersoll & Rooney PC

(57) ABSTRACT

It is determined whether or not a USB display button is pressed, and if so determined, a USB device status management table in a USB device status management part is referenced. Ranking determination is made based on information on the USB device status management table. After the ranking determination, priority is set based on the ranking determination result. Then, a USB device priority screen is displayed on a manipulation display of a manipulation panel part.

15 Claims, 13 Drawing Sheets

| USB CONNECTOR NUMBER | INSTRUMENT TYPE | AUTHENTICATION STATE/USAGE STATE | JOB STATE | RANK |
|---|---|---|---|---|
| CN1 | USB MEMORY | USER D: UNDER AUTHENTICATION | DATA READING STATE | 6 |
| CN2 | USB HDD | USER A: UNDER AUTHENTICATION | DATA-READ COMPLETED STATE | 3-D |
| CN3 | USB MEMORY | USER C: UNDER AUTHENTICATION | DATA-READ COMPLETED STATE | 3-B |
| CN4 | USB HDD | USER B: UNDER AUTHENTICATION | IDLING STATE (SUSPENDED JOB) | 4 |
| CN5 | USB MEMORY | UNAUTHENTICATED (DURING USER LOGOUT) | IDLING STATE (SUSPENDED JOB) | 2 |
| CN6 | AUTHENTICATION DEVICE | IN USE | — | 7 |

(56) References Cited

U.S. PATENT DOCUMENTS

| | | | |
|---|---|---|---|
| 2004/0049556 A1 | 3/2004 | Watanabe | |
| 2004/0054863 A1* | 3/2004 | Harada et al. | 711/164 |
| 2004/0090651 A1* | 5/2004 | Kang et al. | 358/1.16 |
| 2004/0212735 A1 | 10/2004 | Kitamura | |
| 2005/0023339 A1 | 2/2005 | Uno | |
| 2005/0036397 A1 | 2/2005 | Yeh et al. | |
| 2005/0134704 A1 | 6/2005 | Uryu et al. | |
| 2006/0101182 A1 | 5/2006 | Drabczuk | |
| 2008/0055827 A1 | 3/2008 | Homer et al. | |
| 2008/0155284 A1 | 6/2008 | Shimohata et al. | |
| 2009/0019191 A1 | 1/2009 | Ito | |
| 2009/0157912 A1 | 6/2009 | Kakizaki | |
| 2009/0177782 A1 | 7/2009 | Blatherwick et al. | |
| 2009/0177809 A1 | 7/2009 | Bhesania et al. | |
| 2009/0287856 A1 | 11/2009 | Ito | |

FOREIGN PATENT DOCUMENTS

| | | |
|---|---|---|
| JP | 2002-041441 | 2/2002 |
| JP | 2002-218300 | 8/2002 |
| JP | 2002-281033 | 9/2002 |
| JP | 2003-163786 | 6/2003 |
| JP | 2003-316711 | 11/2003 |
| JP | 2005-017855 | 1/2005 |
| JP | 2005-032145 | 2/2005 |
| JP | 2005-102034 | 4/2005 |
| JP | 2005-131825 | 5/2005 |
| JP | 2006-107376 A | 4/2006 |
| JP | 2006-108867 | 4/2006 |
| JP | 2006-140644 A | 6/2006 |
| JP | 2006-338358 | 12/2006 |
| JP | 2007-053792 | 3/2007 |
| JP | 2007-094581 | 4/2007 |
| JP | 2008-117237 | 5/2008 |
| JP | 2009-152694 | 7/2009 |

OTHER PUBLICATIONS

Yasushi Sakakibara, "Free Tool Often Used by Professionals for Net Management" Nikkei Communication, Japan, Nikkei Business Publications, Inc., Sep. 1, 2007, No. 493, pp. 64-74.

NirSoft, "USBDeview v1.45—View all Installed/connected USB devices on you" http://www.nirsoft.net/utils/usb_devices_view.html, Oct. 29, 2009, 11 pages.

Notice of Grounds of Rejection issued in corresponding Japanese Application No. 2008-006040 dated Nov. 10, 2009, and an English Translation thereof.

Hewlett-Packard Company, "hp photosmart 1000" user's guide; 2000; pp. 21-26 and 87-90.

Hewlett-Packard Company, "hp psc 2500 photosmart series all-in-one" reference guide; 2003; pp. 21-34.

NirSoft USBDeview v1.18—View all installed/connected Usb devices on your system, May 10, 2008 by Nir Sofer Retrieved from http://web.archive.org/web/20080510095634/http://www.nirsoft.net/utils/usb_devices_view.html.

Decision to Grant Patent dated Jul. 6, 2010, issued in the corresponding Japanese Patent Application No. 2008-129727, and an English-language translation thereof, 6 pps.

* cited by examiner

Fig. 4

| INSTRUMENT TYPE | STATE | UNDER USER AUTHENTICATION OR NOT | ACTUAL ACCESS TO USB INSTRUMENT | JOB | POSSIBILITY OF ACCESSING USB INSTRUMENT | RANK | SUB-RANK |
|---|---|---|---|---|---|---|---|
| USB MEMORY | IN PRINTING DATA READ FROM USB MEMORY : IN READING DATA | | PRESENCE | RUNNING | PRESENCE | EXTRACTION AND INSERTION ARE NOT PERMITTED DUE TO ACTUAL ACCESS (RANK 6) | |
| | IN PRINTING DATA READ FROM USB MEMORY : DATA READ IS COMPLETED | | ABSENCE | RUNNING | ABSENCE | NO ACTUAL ACCESS AND LOW POSSIBILITY OF ACCESSING USB INSTRUMENT (RANK 3) | USB MEMORY IS NORMALLY ENDED (RANK 3-B) |
| | ERROR OCCURS IN PRINTING DATA READ FROM USB MEMORY : ERROR OCCURS IN READING DATA | | PRESENCE | RUNNING | PRESENCE | EXTRACTION AND INSERTION ARE NOT PERMITTED DUE TO ACTUAL ACCESS (RANK 6) | |
| | ERROR OCCURS IN PRINTING DATA READ FROM USB MEMORY : ERROR OCCURS AFTER DATA READ IS COMPLETED | | ABSENCE | RUNNING | ABSENCE | NO ACTUAL ACCESS AND LOW POSSIBILITY OF ACCESSING USB INSTRUMENT (RANK 3) | USB MEMORY IS ABNORMALLY ENDED (RANK 3-A) |
| | IN STORING SCANNED DATA IN USB MEMORY : BEFORE DATA WRITE | | ABSENCE | RUNNING | PRESENCE | NO ACTUAL ACCESS BUT HIGH POSSIBILITY OF ACCESSING USB INSTRUMENT (RUNNING JOB) (RANK 5) | USB MEMORY IS STOPPED BEFORE ACCESS (RANK 5-B) |
| | IN STORING SCANNED DATA IN USB MEMORY : IN WRITING DATA | | PRESENCE | RUNNING | PRESENCE | EXTRACTION AND INSERTION ARE NOT PERMITTED DUE TO ACTUAL ACCESS (RANK 6) | |
| | ERROR OCCURS IN WRITING SCANNED DATA IN USB MEMORY :ERROR OCCURS BEFORE DATA WRITE | | ABSENCE | RUNNING | PRESENCE | NO ACTUAL ACCESS BUT HIGH POSSIBILITY OF ACCESSING USB INSTRUMENT (RUNNING JOB) (RANK 5) | ERROR OCCURS IN USB MEMORY DURING ACCESS (RANK 5-A) |
| | ERROR OCCURS IN WRITING SCANNED DATA IN USB MEMORY :ERROR OCCURS IN WRITING DATA | | PRESENCE | RUNNING | PRESENCE | EXTRACTION AND INSERTION ARE NOT PERMITTED DUE TO ACTUAL ACCESS (RANK 6) | |
| | NO ACCESS TO USB :AT LEAST ONE DATA READ OR AT LEAST ONE DATA WRITE IS PRESENT | UNDER USER AUTHENTICATION | ABSENCE | SUSPENDED | PRESENCE | NO ACTUAL ACCESS BUT HIGH POSSIBILITY OF ACCESSING USB INSTRUMENT (RANK 4) | USB MEMORY COMPLETES JOB ONCE (RANK 4-A) |
| | NO ACCESS TO USB :AT LEAST ONE DATA READ OR AT LEAST ONE DATA WRITE IS PRESENT | DURING USER LOGOUT | ABSENCE | SUSPENDED | ABSENCE | NO ACTUAL ACCESS AND HIGH POSSIBILITY OF USB INSTRUMENT'S BEING LEFT AS IT IS (RANK 2) | USB MEMORY COMPLETES JOB ONCE (RANK 2-A) |
| | NO ACCESS TO USB :NO DATA READ NOR DATA WRITE | UNDER USER AUTHENTICATION | ABSENCE | SUSPENDED | PRESENCE | NO ACTUAL ACCESS BUT HIGH POSSIBILITY OF ACCESSING USB INSTRUMENT (RANK 4) | JOB IS NOT INPUTTED IN USB MEMORY (RANK 4-B) |
| | NO ACCESS TO USB :NO DATA READ NOR DATA WRITE | DURING USER LOGOUT | ABSENCE | SUSPENDED | ABSENCE | NO ACTUAL ACCESS AND HIGH POSSIBILITY OF USB INSTRUMENT'S BEING LEFT AS IT IS (RANK 2) | JOB IS NOT INPUTTED IN USB MEMORY (RANK 2-B) |
| USB HARD DISK | IN PRINTING DATA READ FROM USB HDD :IN READING DATA | | PRESENCE | RUNNING | PRESENCE | EXTRACTION AND INSERTION ARE NOT PERMITTED DUE TO ACTUAL ACCESS (RANK 6) | |
| | IN PRINTING DATA READ FROM USB HDD :DATA READ IS COMPLETED | | ABSENCE | RUNNING | ABSENCE | NO ACTUAL ACCESS AND LOW POSSIBILITY OF ACCESSING USB INSTRUMENT (RANK 3) | USB HDD IS NORMALLY ENDED (RANK 3-D) |
| | ERROR OCCURS IN PRINTING DATA READ FROM USB HDD :ERROR OCCURS IN READING DATA | | PRESENCE | RUNNING | PRESENCE | EXTRACTION AND INSERTION ARE NOT PERMITTED DUE TO ACTUAL ACCESS (RANK 6) | |
| | ERROR OCCURS IN PRINTING DATA READ FROM USB HDD :ERROR OCCURS AFTER DATA READ IS COMPLETED | | ABSENCE | RUNNING | ABSENCE | NO ACTUAL ACCESS AND LOW POSSIBILITY OF ACCESSING USB INSTRUMENT (RANK 3) | USB HDD IS ABNORMALLY ENDED (RANK 3-C) |
| | IN STORING SCANNED DATA IN USB HDD :BEFORE DATA WRITE | | ABSENCE | RUNNING | PRESENCE | NO ACTUAL ACCESS BUT HIGH POSSIBILITY OF ACCESSING USB INSTRUMENT (RUNNING JOB) (RANK 5) | USB HDD IS STOPPED BEFORE ACCESS (RANK 5-C) |
| | IN STORING SCAN DATA IN USB HDD :IN WRITING DATA | | PRESENCE | RUNNING | PRESENCE | EXTRACTION AND INSERTION ARE NOT PERMITTED DUE TO ACTUAL ACCESS (RANK 6) | |
| | ERROR OCCURS IN WRITING SCANNED DATA IN USB HDD :ERROR OCCURS BEFORE DATA WRITE | | ABSENCE | RUNNING | PRESENCE | NO ACTUAL ACCESS BUT HIGH POSSIBILITY OF ACCESSING USB INSTRUMENT (RUNNING JOB) (RANK 5) | ERROR OCCURS IN USB HDD DURING ACCESS (RANK 5-D) |
| | ERROR OCCURS IN WRITING SCANNED DATA IN USB HDD :ERROR OCCURS IN WRITING DATA | | PRESENCE | RUNNING | PRESENCE | EXTRACTION AND INSERTION ARE NOT PERMITTED DUE TO ACTUAL ACCESS (RANK 6) | |
| | NO ACCESS TO USB :AT LEAST ONE DATA READ OR AT LEAST ONE DATA WRITE IS PRESENT | UNDER USER AUTHENTICATION | ABSENCE | SUSPENDED | PRESENCE | NO ACTUAL ACCESS BUT HIGH POSSIBILITY OF ACCESSING USB INSTRUMENT (RANK 4) | USB HDD COMPLETES JOB ONCE (RANK 4-C) |
| | NO ACCESS TO USB :AT LEAST ONE DATA READ OR AT LEAST ONE DATA WRITE IS PRESENT | DURING USER LOGOUT | ABSENCE | SUSPENDED | ABSENCE | NO ACTUAL ACCESS AND HIGH POSSIBILITY OF USB INSTRUMENT'S BEING LEFT AS IT IS (RANK 2) | USB HDD COMPLETES JOB ONCE (RANK 2-C) |
| | NO ACCESS TO USB :NO DATA READ NOR DATA WRITE | UNDER USER AUTHENTICATION | ABSENCE | SUSPENDED | PRESENCE | NO ACTUAL ACCESS BUT HIGH POSSIBILITY OF ACCESSING USB INSTRUMENT (RANK 4) | JOB IS NOT INPUTTED IN USB HDD (RANK 4-D) |
| | NO ACCESS TO USB :NO DATA READ NOR DATA WRITE | DURING USER LOGOUT | ABSENCE | SUSPENDED | ABSENCE | NO ACTUAL ACCESS AND HIGH POSSIBILITY OF USB INSTRUMENT'S BEING LEFT AS IT IS (RANK 2) | JOB IS NOT INPUTTED IN USB HDD (RANK 2-D) |
| AUTHENTICATION DEVICE | NON-USE | | ABSENCE | — | ABSENCE | NO MEANING FOR CONNECTION (RANK 1) | |
| | USE | | ABSENCE | — | ABSENCE | EXTRACTION AND INSERTION ARE NOT PERMITTED BECAUSE USER AUTHENTICATION CANNOT BE USED (RANK 7) | |

Fig. 5

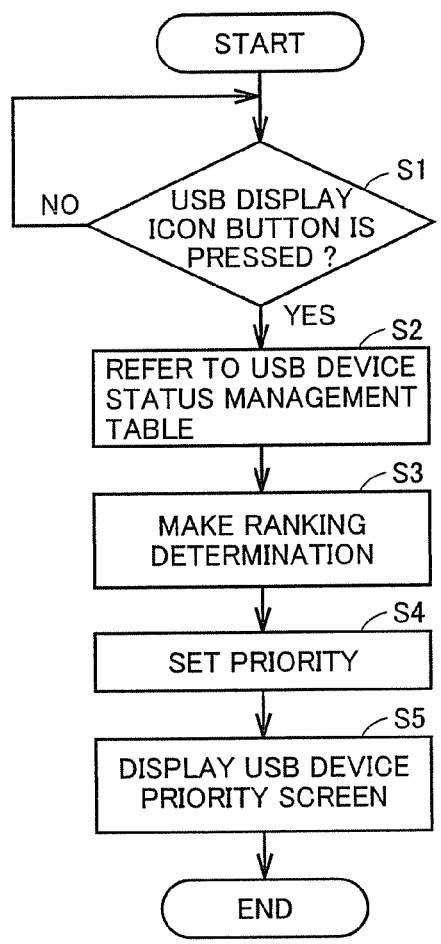

Fig. 6

USB DEVICE STATUS MANAGEMENT TABLE

| USB CONNECTOR NUMBER | INSTRUMENT TYPE | AUTHENTICATION STATE/USAGE STATE | JOB STATE | RANK |
|---|---|---|---|---|
| CN1 | USB MEMORY | USER D: UNDER AUTHENTICATION | DATA READING STATE | 6 |
| CN2 | USB HDD | USER A: UNDER AUTHENTICATION | DATA PRE-WRITING STATE | 5 |
| CN3 | USB MEMORY | USER C: UNDER AUTHENTICATION | DATA-READ COMPLETED STATE | 3 |
| CN4 | USB HDD | USER B: UNDER AUTHENTICATION | IDLING STATE (SUSPENDED JOB) | 4 |
| CN5 | USB MEMORY | UNAUTHENTICATED (DURING USER LOGOUT) | IDLING STATE (SUSPENDED JOB) | 2 |
| CN6 | AUTHENTICATION DEVICE | IN USE | — | 7 |

Fig. 14

| USB CONNECTOR NUMBER | INSTRUMENT TYPE | AUTHENTICATION STATE/USAGE STATE | JOB STATE | RANK |
|---|---|---|---|---|
| CN1 | USB MEMORY | USER D: UNDER AUTHENTICATION | DATA READING STATE | 6 |
| CN2 | USB HDD | USER A: UNDER AUTHENTICATION | DATA-READ COMPLETED STATE | 3-D |
| CN3 | USB MEMORY | USER C: UNDER AUTHENTICATION | DATA-READ COMPLETED STATE | 3-B |
| CN4 | USB HDD | USER B: UNDER AUTHENTICATION | IDLING STATE (SUSPENDED JOB) | 4 |
| CN5 | USB MEMORY | UNAUTHENTICATED (DURING USER LOGOUT) | IDLING STATE (SUSPENDED JOB) | 2 |
| CN6 | AUTHENTICATION DEVICE | IN USE | — | 7 |

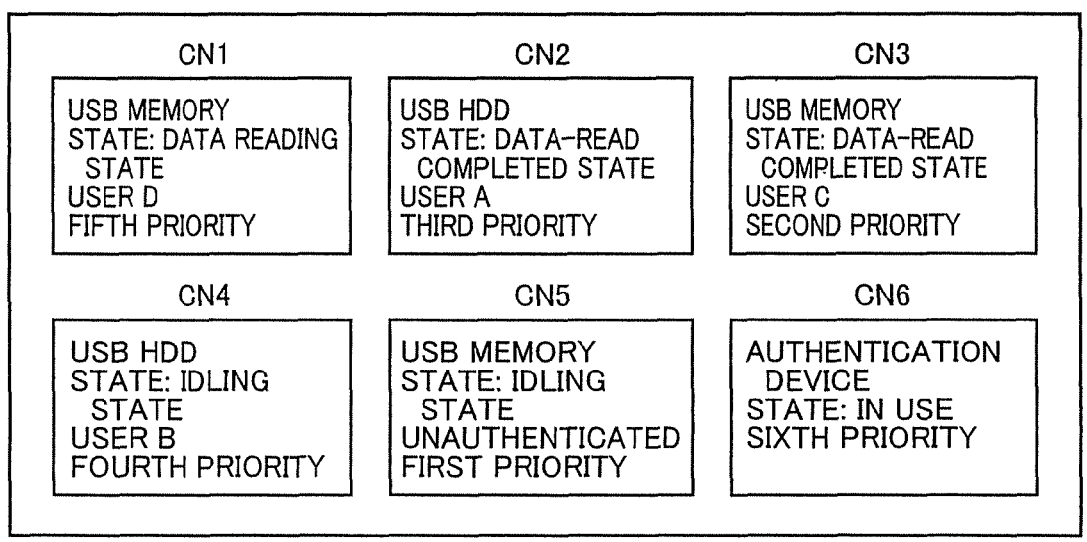

Fig. 15

IMAGE FORMING APPARATUS CAPABLE OF EFFICIENTLY AND EFFECTIVELY USING USB CONNECTOR

This application is based on Japanese Patent Application No. 2008-006040 filed with the Japan Patent Office on Jan. 15, 2008, the entire content of which is hereby incorporated by reference.

BACKGROUND OF TEE INVENTION

1. Field of the Invention

The present invention relates to an image forming apparatus, particularly to an image forming apparatus including a USB (Universal Serial Bus) connector attachable to a USB device.

2. Description of the Related Art

Recently, with the widespread use of USB memories, it is frequently seen that a user always carries a USB memory in which document data is stored.

In order to comply with such a case, among MFPs (Multi Function Peripherals) which are one example of the image forming apparatus, an MFP with a so-called USB memory print function and a so-called USB memory scan (also referred to as a Scan To USB memory) function has been increasing in number. With the USB memory print function, documents stored in the USB memory are printed with the MFP. With the USB memory scan function, paper-medium data is digitized and stored in the USB memory attached to the USB connector.

In this respect, when the USB memory scan function is performed for a large amount of documents, the user possibly leaves the spot before the job is completed. When the USB memory scan function is performed, image data is converted to a PDF (Portable Document Format) or the like after the scan operation on the large amount of documents is completed, and a write operation to the USB memory is performed. Therefore, it may take a considerable time to perform the conversion of the large amount of documents to the image data and the write operation processing.

Also, the user who performed the USB memory print function possibly takes only the outputted paper media and the user leaves the MFP with the USB memory itself still attached to the MFP.

Accordingly, the user sometimes forgets to extract the USB memory although the job such as the USB memory scan function and the USB memory print function has been completed.

For example, Japanese Laid-Open Patent Publication No. 2006-140644 discloses a technique in which, in order to prevent the user from forgetting to extract the USB memory, the print operation is not started unless the USB memory is extracted.

However, in the case where the technique disclosed in Japanese Laid-Open Patent Publication No. 2006-140644 is used in the MFP, since the user usually thinks that the print operation will be started when a print button is pressed, the user possibly cannot see the MFP manipulation that the print operation is not started unless the USB memory is extracted.

On the other hand, the case in which the function is expanded by connecting an external device to the USB connector of the MFP is increased because of diversification of the USB device.

Examples of the expanded function include a USB keyboard, a USB-IC card reader, a USB finger-print authentication device, and a USB mouse. A plurality of USB connectors are generally mounted on the MFP for these expanded functions.

Generally, the MFP is produced for multi users, the job can be operated in a multi mode, and access to the USB device can also be operated in the multi mode. Accordingly, a plurality of USB memories are sometimes attached to the plurality of USB connectors of the MFP.

In this respect, when, in the MFP used in a multi mode environment by multi users, a plurality of USB devices share a connectable environment, there is a limitation in the number of connectors to which the USB devices can be connected, and there is a limitation in the number of connectors which can be used by the plurality of users.

For example, the access to the USB device for data storage, data write, and the like is stopped, and the use of the USB device is restricted until the connector becomes vacant even if the USB device is extracted without any problem.

Although the user who wants to use the USB device can extract the USB device whose job is actually completed, the user possibly mistakenly extracts the USB device in an access state when no connector connectable to the USB device (empty port) exists. In the case where the connector to which a USB device can be connected does not exist when a new USB device is to be connected and used, the user sometimes waits for the time when another person who possesses the USB device completes the use of the USB device to extract the USB device.

In a MFP which can reserve a plurality of jobs to perform the jobs in a predetermined order, a USB memory can be attached to reserve a job. However, in the case where a new job cannot be performed because connectors for USB memories are closed, the user cannot distinguish between the USB memory with which another person reserves a job and the USB memory in which another person does not reverse a job, e.g., a USB memory whose data is transferred to the MFP side. Therefore, the user hardly finds whether the USB memory can be extracted.

Furthermore, in the same situation, the user is not sure how long it takes for the user to be able to extract the previous USB device and insert a new USB device.

In the case where both the USB memory and a USB hard disk (HDD) are attached to a connector while other USB devices, e.g., a USB HDD in addition to the USB memory can be attached, the user may sometimes not sure which of the USB memory and the USB HDD can be preferentially extracted.

Thus, a plurality of connectors to which USB devices can be connected cannot efficiently and effectively be used in the conventional technique.

SUMMARY OF THE INVENTION

In view of the foregoing, an object of the present invention is to provide an image forming apparatus in which USB connectors can efficiently and effectively be used in an image forming apparatus in which a plurality of USB devices can be attached to a plurality of USB connectors.

In accordance with the present invention, an image forming apparatus includes a plurality of detachable parts to which a plurality of detachable storage devices or a plurality of detachable authentication devices can be attached; a state management part that manages states of the detachable storage devices or the detachable authentication devices attached to the detachable parts, and a control part that displays a detachable storage device or a detachable authentication device which is detachable among the plurality of detachable storage devices or the plurality of detachable authentication devices attached to the plurality of detachable parts based on state management information in the state management part.

Preferably, the image forming apparatus further includes a detection part that manages connection statuses of the detachable storage devices or the detachable authentication devices attached to the plurality of detachable parts. The control part displays a detachable storage device or a detachable authentication device which is detachable among the plurality of detachable storage devices or the plurality of detachable authentication devices attached to the plurality of detachable parts based on the state management information in the state management part, when the detachable storage devices or the detachable authentication devices are connected to all the plurality of detachable parts according to a detection result from the detection part.

Preferably, the image forming apparatus further includes an authentication part that performs authentication processing of a user. The control part displays a detachable storage device which is detachable among the plurality of detachable storage devices attached to the plurality of detachable parts based on the state management information in the state management part in response to an authentication result of the authentication part.

In particular, the state management part manages authentication results for the detachable storage devices attached to the plurality of detachable parts. The control part gives lower priority indicating a detachable degree to a detachable storage device in an authentication state than that of a detachable storage device not in the authentication state based on state management information including the authentication states of the detachable storage devices attached to the plurality of detachable parts.

Preferably, the control part displays priority indicating a detachable degree according to the plurality of detachable storage devices or the plurality of detachable authentication devices attached to the plurality of detachable parts.

In particular, the state management part manages access states for the detachable storage devices attached to the plurality of detachable parts The control part gives lower priority indicating a detachable degree to a detachable storage device in the access state than that of a detachable storage device not in the access state based on state management information including the access states of the detachable storage devices attached to the plurality of detachable parts.

In particular, the control part measures an estimated time until access is completed for the detachable storage device in the access state among the detachable storage devices attached to the plurality of detachable parts, and displays priority indicating a detachable degree for the detachable storage device in the access state based on the measured estimated time.

In particular, the image forming apparatus further includes a document scanning part that scans a document to generate electronic data; and a write part that writes the electronic data generated by the document scanning part in the detachable storage devices. The access state corresponds to an operation state in which the electronic data generated by the document scanning part is written in the detachable storage devices.

In particular, the image forming apparatus further includes a read part that reads electronic data from the detachable storage devices; and a printing part that prints the read electronic data. The access state corresponds to an operation state in which the electronic data is read from the detachable storage devices to print the electronic data with the printing part.

In particular, the image forming apparatus further includes a document scanning part that scans a document to generate electronic data; and a write part that writes the electronic data generated by the document scanning part in the detachable storage devices. The control part includes a job control part that controls the document scanning part and the write part to perform a job to a detachable storage device specified among the plurality of detachable storage devices; and a display control part that displays priority indicating a detachable degree of a detachable storage device among the plurality of detachable storage devices. The display control part gives lower priority indicating a detachable degree to a detachable storage device in a job running state than that of a detachable storage device not in the job running state based on job running information included in state management information in the state management part.

In particular, the display control part measures an estimated time until access is completed for the detachable storage device in the access state among the detachable storage devices attached to the plurality of detachable parts, and displays priority indicating a detachable degree for the detachable storage device in the access state based on the measured estimated time.

In particular, the image forming apparatus further includes a read part that reads electronic data from the detachable storage devices; and a printing part that prints the read electronic data. The control part includes a job control part that controls the read part and the printing part to perform a job to a detachable storage device specified among the plurality of detachable storage devices; and a display control part that displays priority indicating a detachable degree of a detachable storage device among the plurality of detachable storage devices. The display control part gives lower priority indicating a detachable degree to a detachable storage device in a job running state than that of a detachable storage device not in the job running state based on job running information included in state management information in the state management part.

In particular, the display control part measures an estimated time until access is completed for the detachable storage device in the access state among the detachable storage devices attached to the plurality of detachable parts, and displays priority indicating a detachable degree for the detachable storage device in the access state based on the measured estimated time.

In particular, the plurality of detachable storage devices correspond to at least one of a USB memory and a USB HDD. The control part performs display while lower priority indicating a detachable degree is given to the USB HDD rather than the USB memory.

The state management part that manages the states of the detachable storage devices or the detachable authentication devices attached to the plurality of detachable parts and the control part that displays a detachable storage device or a detachable authentication device which is detachable among the plurality of detachable storage devices or the plurality of detachable authentication devices attached to the plurality of detachable parts based on the state management information in the state management part are provided in the image forming apparatus according to the present invention. Therefore, an image forming apparatus in which USB connectors can efficiently and effectively be used can be provided in the image forming apparatus in which a plurality of USB devices can be attached to a plurality of USB connectors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating a correspondence table in which ranking can be performed based on the type of a USB device and the states of the USB device according to an embodiment of the present invention.

FIG. 5 is a flowchart showing control for displaying priority of a USB memory device based on information from a USB memory device status management part in a panel control part.

FIG. 6 is a diagram illustrating an example of a USB device status management table.

FIG. 14 is a diagram illustrating another example of the USB device status management table.

FIG. 15 is a diagram illustrating another example of the USB device priority screen based on information in the USB device status management table of FIG. 14.

DESCRIPTION OF THE PREFERRED EMBODIMENTS

Figure 1:
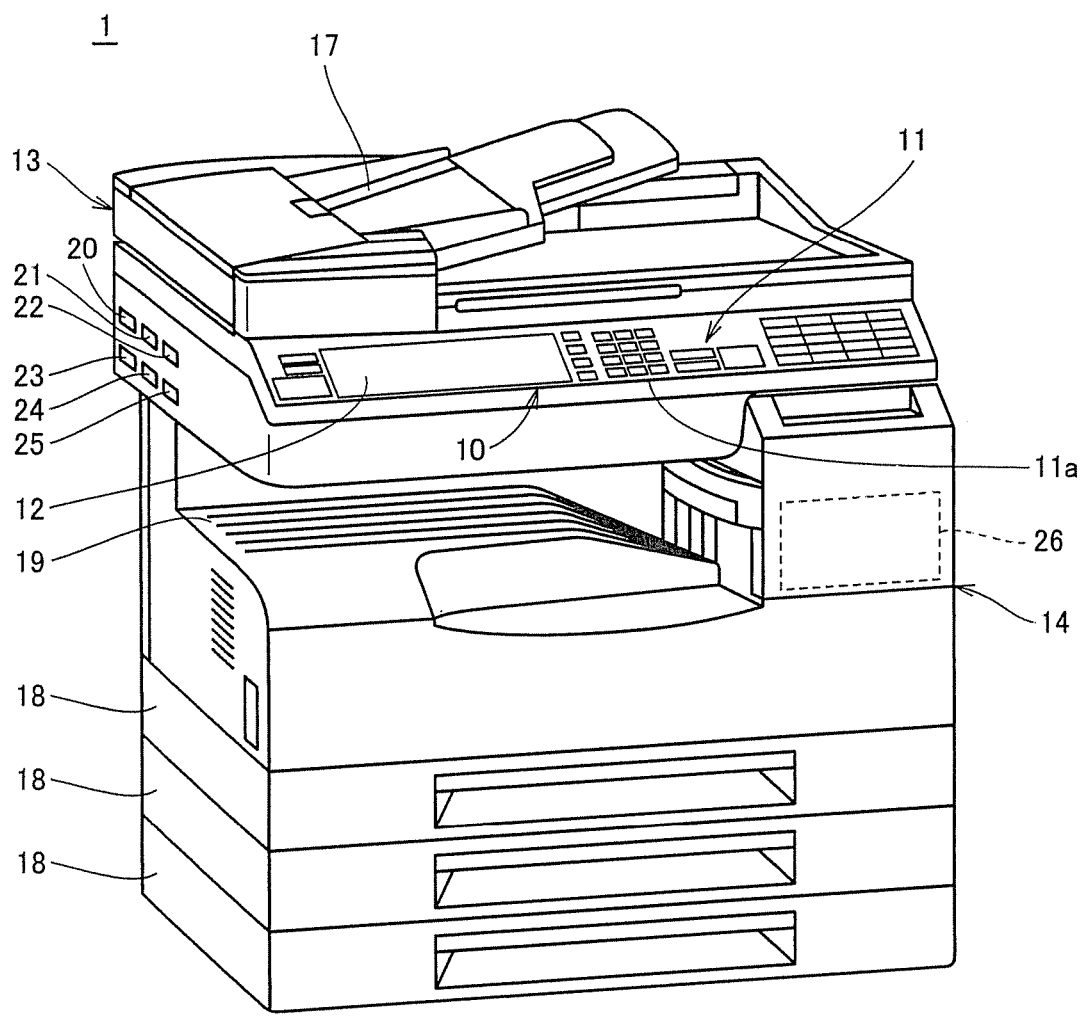
FIG. 1 is a perspective view showing an MFP as an image forming apparatus according to an embodiment of the present invention.

Preferred embodiments of the present invention will be described below with reference to the drawings. In the following description, the same components and elements are designated by the same reference numerals. The same components and elements also have the same names and functions.

First Embodiment

Overall Configuration of MFP

Referring to FIG. 1, an MFP 1 according to an embodiment of the present invention is a digital multi function peripheral having a copy function, a scanner function, and the like.

MFP 1 has slots 20 to 25 which allows detachable connection of a plurality of (six in this embodiment) USB-standard external devices. Data can be transmitted and received between external devices and MFP 1 by connecting the external devices having USB interfaces, such as a USB memory and a USB HDD, to slots 20 to 25. Hereinafter slots 20 to 25 are also referred to as USB slots or USB connectors.

MFP 1 includes a manipulation panel part 10, and manipulation panel part 10 includes a plurality of keys 11a, a manipulation part 11 which accepts various instructions and data inputs such as characters and numerals which are made through keys 11a by user's manipulation, and a manipulation display 12 formed of a liquid crystal display and the like which displays an instruction menu to a user and information on an obtained image.

MFP 1 includes a scanner part 13 which optically scans a document to obtain image data and a printer part 14 which prints an image on a recording sheet based on the image data.

A feeder part 17 which feeds a document to scanner part 13 is provided on an upper surface of the main body of MFP 1, a sheet feed part 18 which supplies a recording sheet to printer part 14 is provided in a lower portion, and a tray 19 is provided in a central portion to discharge a recording sheet on which an image is printed by printer part 14.

Further provided in the main body of MFP 1 are a storage part 26 in which a control program used in each part for controlling the main body and necessary data such as image data are stored, and the like.

Manipulation display 12 displays various modes, a USB device extraction priority order to be described later, and others, and various setting is performed according to the display contents and the like. Manipulation part 11 is used when the user performs various inputs. These parts act as a main part of the user interfac.

Scanner part 13 obtains image data by photoelectrically scanning image information such as a photograph, characters, and a picture from a document. An image control part to be described later converts the obtained image data (density data) to digital data, and well-known various image processing is performed thereon. Then the digital data is tentatively stored in a memory and is transmitted to printer part 14 or a USB device and the like to print the image or to retain the data.

Printer part 14 prints an image on a recording sheet based on the image data obtained from scanner part 13 or the image data stored in the USB device and the like.

Figure 2:
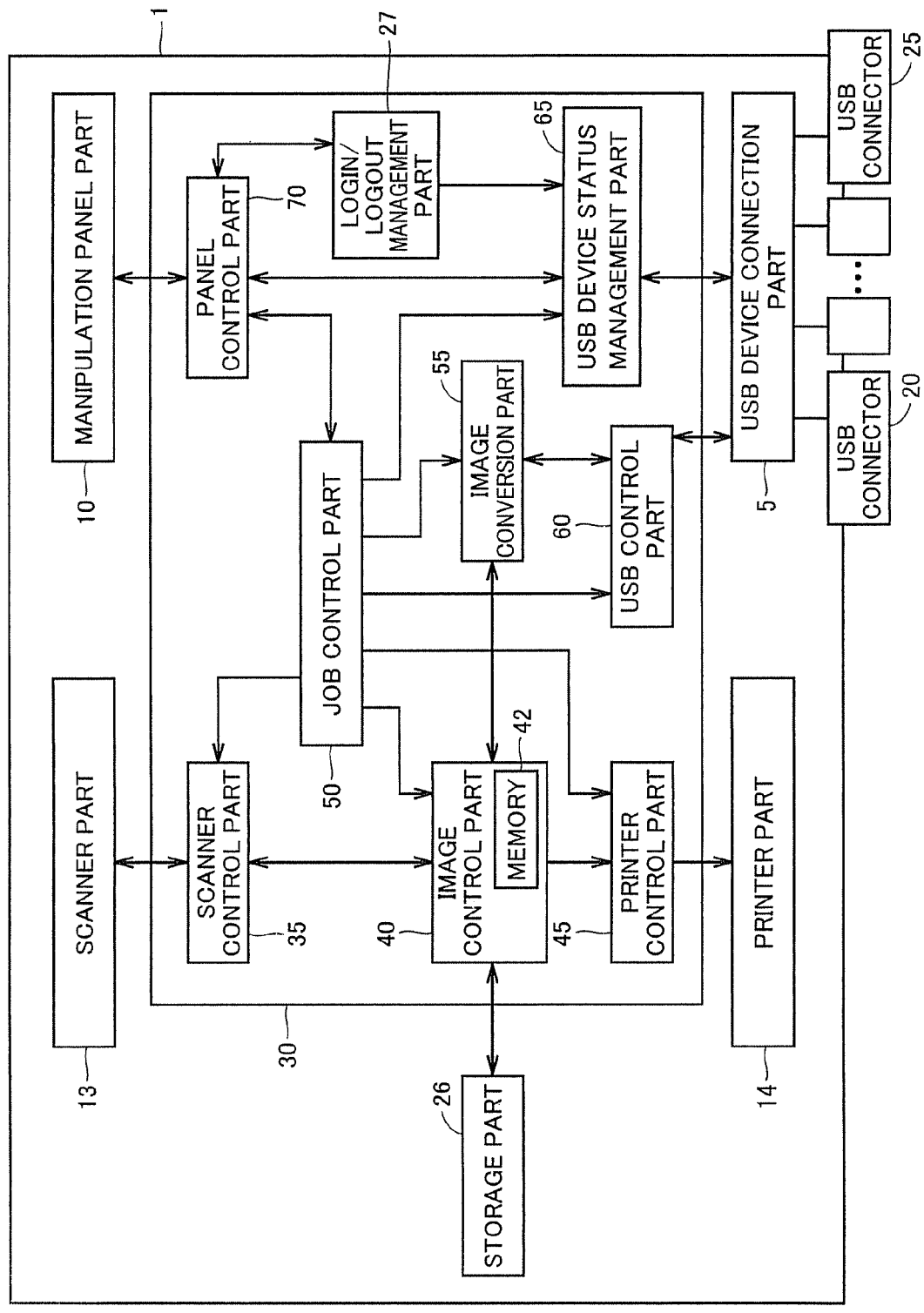
FIG. 2 is a functional block diagram of the MFP which is an image forming apparatus according to a first embodiment of the present invention.

Referring to FIG. 2, functional blocks of MFP 1 which is the image forming apparatus according to a first embodiment of the present invention will be described below.

Referring to FIG. 2, MFP 1 according to the first embodiment of the present invention includes scanner part 13 which converts data such as a paper medium to electronic data, storage part 26 formed of, e.g., a hard disk (HDD), printer part 14 which performs print process, USB connectors 20 to 25 for attaching the USB devices, a USB device connection part 5 which controls connection between USB connectors 20 to 25 and the USB devices, manipulation panel part 10 including the manipulation display, and a control part 30 which controls the whole MFP.

When a USB device is attached to each of USB connectors 20 to 25, USB device connection part 5 detects the attachment to output the detection information on the attached instrument to a USB device status management part 65.

Control part 30 includes a scanner control part 35, an image control part 40, a printer control part 45, a USB control part 60, USB device status management part 65, an image conversion part 55, a panel control part 70, a job control part 50, and a login/logout management part 27. Scanner control part 35 controls scanner part 13. Image control part 40 performs image processing. Printer control part 45 controls printer part 14. USB control part 60 accesses a USB device through USB device connection part 5. USB device status management part 65 manages a USB device attachment state, a job state, and the like. Image conversion part 55 performs format conversion on image data. Panel control part 70 controls contents displayed on manipulation panel part 10 and outputs an instruction to a manipulation input from manipulation panel part 10 to job control part 50. Job control part 50 controls jobs of MFP 1. A control program for executing functions of each part of control part 30 and the like are stored in storage part 26, and a predetermined function is executed by reading the control program stored in storage part 26.

When image data which is electronic data scan-processed by scanner part 13 is inputted to image control part 40 through scanner control part 35, image control part 40 performs image processing, thereafter tentatively stores the image data in an internal memory 42, and then outputs the image data to printer control part 45 or image conversion part 55 according to an instruction of job control part 50. According to an instruction of job control part 50, image control part 40 tentatively stores the image data inputted from image conversion part 55 in internal memory 42 and outputs the image data to printer control part 45.

When receiving the input of image data from image control part 40, printer control part 45 provides a print instruction to printer part 14. Printer part 14 performs a print process on the image data for which the print instruction is provided by printer control part 45.

In response to an instruction from job control part 50, image conversion part 55 converts an image data inputted from image control part 40 to a predetermined format and outputs the same to USB control part 60. Alternatively, image conversion part 55 also converts image data inputted from a USB device through USB control part 60 to a predetermined format and outputs the same to image control part 40.

In response to an instruction from job control part 50, USB control part 60 outputs the image data whose format is converted by image conversion part 55 to a USB device (for example, a USB memory) through a USB connector whose connection is controlled by USB device connection part 5 and performs write processing on the USB device (for example, the USB memory). In response to an instruction from job control part 50, USB control part 60 also performs processing for reading the image data from the USB device (for example, the USB memory) through the USB connector whose connection is controlled by USB device connection part 5.

USB device status management part 65 receives detection information on an attached USB device (instrument) from USB device connection part 5 and manages the USB device attachment state and the USB device job state. Specifically, USB device status management part 65 has a USB device status management table used to manage the type of instruments, an authentication state, a job state, and the like for each USB connector, which will be described later.

When USB device status management part 65 determines that a plurality of USB devices are attached to all USB connectors 20 to 25, USB device status management part 65 outputs the information to panel control part 70. When panel control part 70 receives the information that USB devices are attached to all USB connectors 20 to 25 from USB device status management part 65, panel control part 70 displays a USB display icon button to be described later on the manipulation display of manipulation panel part 10. When pieces of information such as the USB device state are stored in all fields (e.g., six fields in the present embodiment) provided for the USB connectors in the USB device status management table, USB device status management part 65 determines that USB devices are attached to all USB connectors 20 to 25 and outputs the information.

Panel control part 70 outputs display contents to the manipulation display of manipulation panel part 10 and outputs an instruction to the manipulation input from manipulation panel part 10 to job control part 50. When panel control part 70 receives information that USB devices are attached to all USB connectors 20 to 25 from the USB device status management part, panel control part 70 displays the USB display icon button. When the user specifies the USB display icon button, panel control part 70 refers to the USB device status management table of USB device status management part 65 and displays a priority order in which the USB devices attached to the USB connectors can be extracted on the manipulation display based on the information in the USB device status management table. Regarding the USB display icon button, panel control part 70 may perform control such that the USB display icon button is displayed only when user authentication processing to be described later is performed and authentication is confirmed, in addition to the information that USB devices are attached to all USB connectors 20 to 25.

Job control part 50 outputs an operation instruction to each control part to perform various functions (jobs) possessed by MFP 1 according to an instruction of the manipulation input from manipulation panel part 10 through panel control part 70. At this point, when job control part 50 performs a job to a USB device, job control part 50 stores the job state of the corresponding USB device with which the job is performed in the USB device status management table of USB device status management part 65.

Login/logout management part 27 performs user authentication processing according to the manipulation input of manipulation panel part 10 through panel control part 70. At the access to a USB device, when the user authentication processing is performed and authentication is made, login/logout management part 27 outputs authentication information, and information on "user name" and "under authentication" is stored in the field of "authentication state/usage state" to be described later corresponding to the USB device to be accessed in the USB device status management table.

Figure 3:
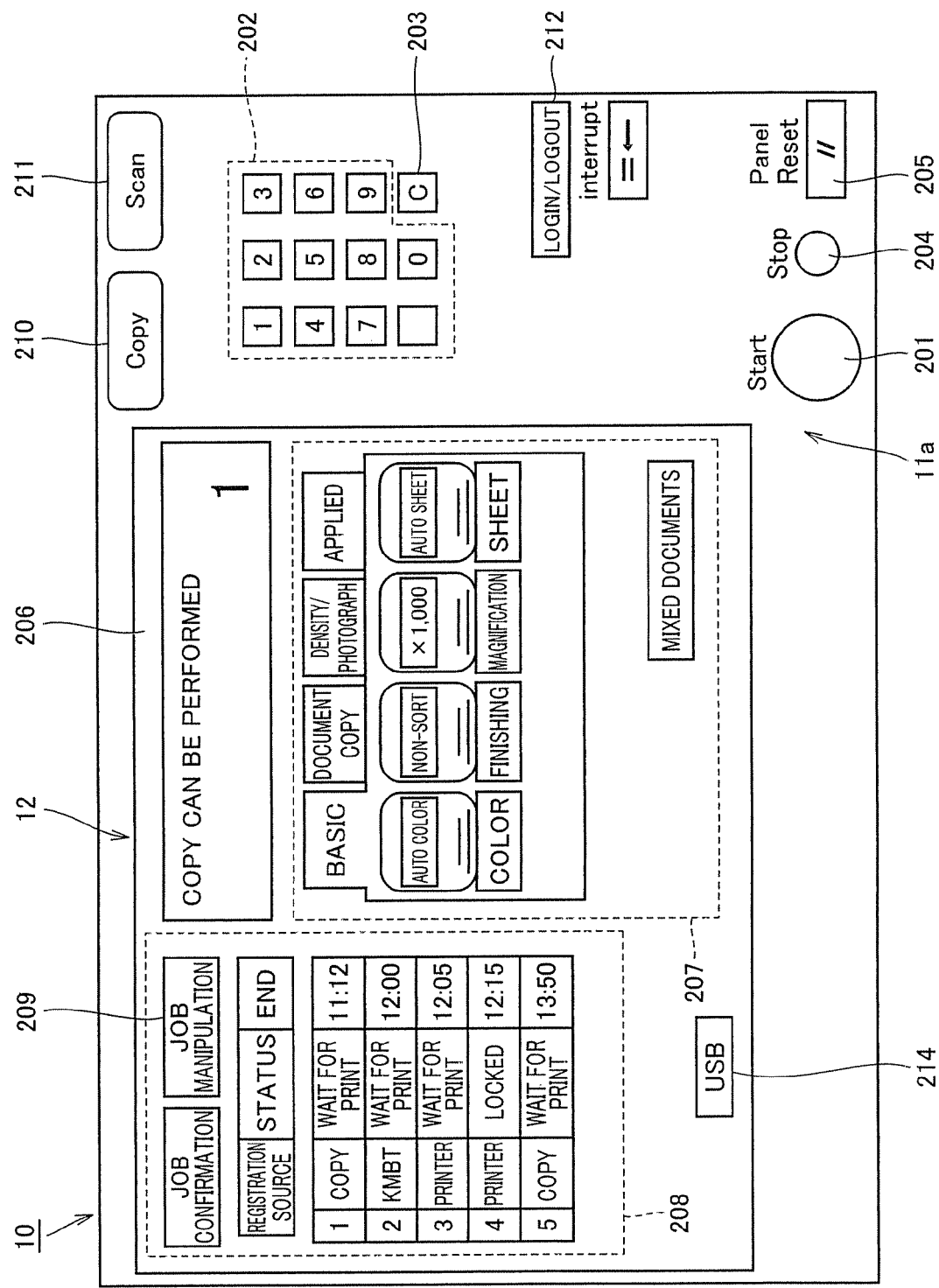
FIG. 3 is a diagram illustrating a configuration of a manipulation panel part in the MFP according to an embodiment of the present invention.

Referring to FIG. 3, a configuration of manipulation panel part 10 in MFP 1 according to an embodiment of the present invention will be described below.

Referring to FIG. 3, a start key 201 is used to start copy and scan operations and the like. A numeric keypad 202 is used to input a numerical value such as the number of copies. A clear key 203 is used to clear inputted numerical values or to discard accumulated image data in the image storage part.

A stop key 204 is used to provide an instruction for stopping the copy/scan operations. A panel reset key 205 is used to cancel setting modes or jobs.

Manipulation display 12 displays various modes, USB device extraction priority order which will be described later, and others, and a touch panel 206 is attached to a surface of manipulation display 12.

The user can perform various setting according to the display contents on manipulation display 12 using touch panel 206. For example, when a setting screen of user ID which is user identification information is displayed on manipulation display 12, the user sets the user ID and the like using various keys of manipulation part 11 or touch buttons displayed on manipulation display 12. In manipulating MFP 1, a login/logout button 212 is pressed down to display, e.g., a login screen, and a registered user ID and the like are inputted to perform the user authentication processing in login/logout management part 27.

Usually, basic and applied setting buttons used in performing the copy operation or scan operation are arranged in a setting screen area 207 in touch panel 206. When each button is pressed, a hierarchical screen is displayed to perform detailed setting.

Job information inputted to MFP 1 at that time is displayed in a job information screen area 208 in touch panel 206. The pieces of job information are displayed in the order in which the job should be performed. In the case where an operation is made to delete or change a specific job, a job manipulation button 209 is selected, and the job number button to be manipulated is pressed. A job manipulation screen is displayed by the manipulation, and the specific job can be manipulated.

A copy key 210 and a scan key 211 are selection keys for setting in which mode of copy and scanner MFP 1 is to be operated.

When copy key 210 is pressed, MFP 1 can be used as a copying machine. In this state, the scanner operation cannot be performed.

At this point, display is performed for various setting for the copy operation in setting screen area 207 in touch panel 206. After various setting is performed, a document is placed and start key 201 is pressed, thereby starting the copy operation.

When scan key 211 is pressed, MFP 1 can be used as a scanner. In this state, the copy operation cannot be performed.

At this point, display is performed for various setting for the scan operation in setting screen area 207 in touch panel 206. After various setting is performed, a document is placed and start key 201 is pressed, thereby starting the scan operation.

Copy key 210 and scan key 211 cause exclusive operations, where one of copy key 210 and scan key 211 becomes automatically a non-selective state when the other is selected.

Referring to FIG. 4, a correspondence table in which ranking can be performed based on the instrument type of USB devices and the state of the USB devices will be described below.

Referring to FIG. 4, in an embodiment of the present invention, the instrument type of USB device is classified into three by way of example. Specifically, a USB memory, a USB hard disk (USB HDD), and an authentication device such as a USB finger-print authentication device are cited as an example.

It is assumed that twelve states are considered as the states of a USB memory and a USB HDD. It is assumed that two states are considered as the states of an authentication device.

In an embodiment of the present invention, for each state of the USB memory, a priority order is decided based on whether under user authentication, presence or absence of actual access of the USB instrument (device), where a job is being performed or suspended, presence or absence of possibility of access to the USB instrument (device). In this example, the state of the USB memory is classified into ranks 1 to 7 by way of example.

Rank 1 has the highest priority to recommend the user to extract the USB device from the USB connector. The priority is decreased in the ascending order, and rank 7 has the lowest priority to recommend the user to extract the USB device from the USB connector.

The ranking of the authentication device such as the USB finger-print authentication device will first be described.

In the case where the setting is made such that use of the authentication device is not requested in MFP 1 while the USB finger-print authentication device is attached to the USB connector, rank 1 which is the highest rank is set, because there is no point in the attachment of authentication device which is the USB device to the USB connector. On the other hand, in the case where the setting is made such that the use of the authentication device is requested in MFP 1, the user authentication processing cannot be performed when the authentication device is extracted from the USB connector. That is, because MFP 1 cannot be manipulated when the authentication device is extracted from the USB connector, the extraction of the authentication device which is the USB device from the USB connector is not desirable, and thus rank 7 which is the lowest priority is set.

The ranking of the USB memory and USB HDD except the authentication device will be described next.

Specifically, the USB memory and the USB HDD are each classified into ranks 2 to 6.

As described above, the USB memory and the USB HDD can be classified into twelve states.

Specifically, the states of the USB memory and USB HDD can be classified into the state in which a job is being performed (running job) and the state in which a job is not performed (suspended job).

For the USB memory, the running job can be classified into the case in which the USB memory print function is performed and the case in which the USB memory scan function is performed.

Specifically, in the case where the USB memory print function is performed, the running job can further be classified into four states.

Specifically, the running job can be classified into a state in which the data stored in the USB memory is tentatively stored in memory 42 while the data read from the USB memory which is the USB memory print function is printed (data reading state) and a state in which the data stored in the USB memory is stored in memory 42 while the data read from the USB memory is printed (data-read completed state).

In this case, the state in which the data stored in the USB memory is tentatively stored in memory 42 (data reading state) is actually getting access (presence of actual access). In the state in which the data stored in the USB memory is stored in memory 42 (data-read completed state), because the data is already stored in memory 42, the actual access is ended (absence of actual access).

In view of the possibility of accessing the USB memory, because the state in which the data stored in the USB memory is tentatively stored in memory 42 (data reading state) is a data reading state, the possibility of accessing the USB memory exists (presence of the possibility of accessing the USB memory). On the other hand, in the state in which the data stored in the USB memory is stored in memory 42 (data-read completed state), because the data is already stored in memory 42, there is low possibility of accessing the USB memory (absence of the possibility of accessing the USB memory).

The running job can be classified into an error state in which an error occurs in tentatively storing the data stored in the USB memory in memory 42 while the error occurs in printing the data read from the USB memory which is the USB memory print function (error in reading data) and an error state in which an error occurs in printing the data after the data stored in the USB memory is stored in memory 42 while the error occurs in printing the data read from the USB memory (error after completion of data read).

In this case, the error state in which the error occurs in tentatively storing the data stored in the USB memory in memory 42 (error in reading data) is in an actual access (presence of actual access). In the error state in which the error occurs in printing the data after the data stored in the USB memory is stored in memory 42 (error after completion of data read), because the data is already stored in memory 42, the actual access is ended (absence of actual access).

In view of the possibility of accessing the USB memory, because the error state in which the error occurs in tentatively storing the data stored in the USB memory in memory 42 (error in reading data) is a data reading state, the possibility of accessing the USB memory exists (presence of the possibility of accessing the USB memory). On the other hand, in the error state in which the error occurs in printing the data after the data stored in the USB memory is stored in memory 42 (error after completion of data read), because the data is already stored in memory 42, there is low possibility of accessing the USB memory (absence of the possibility of accessing the USB memory).

Similarly, in the case where the USB memory scan function is performed, the running job can further be classified into four states.

Specifically, the running job can be classified into a state in which the scanned image data is tentatively stored in memory 42 while the scanned data is retained (stored) in the USB memory which is the USB memory scan function (data pre-writing state) and a state in which the image data stored in memory 42 is retained (stored) in the USB memory while the scanned data is retained (stored) in the USB memory (data writing state).

In the state in which the scanned image data is tentatively stored in memory 42 while the scanned data is being retained (stored) in the USB memory (data pre-writing state), because the access to the USB memory is not performed yet, the actual access is not being performed (absence of actual access). The state in which the image data stored in memory 42 is retained (stored) in the USB memory (data writing state) is in an actual access (presence of actual access).

In view of the possibility of accessing the USB memory, in the state in which the scanned image data is tentatively stored in memory 42 while the scanned data is retained (stored) in the USB memory (data pre-writing state), because access to the USB memory is to be made next to perform data write, the possibility of accessing the USB memory exists (presence of the possibility of accessing the USB memory). On the other hand, because the state in which the image data stored in memory 42 is retained (stored) in the USB memory (data writing state) is a data writing state, the possibility of accessing the USB memory exists (presence of the possibility of accessing the USB memory).

The running job can be classified into an error state in which an error occurs in tentatively storing the scanned data in memory 42 while the error occurs in retaining (storing) the scanned data in the USB memory which is the USB memory scan function (error in pre-writing data) and an error state in which an error occurs in retaining (storing) the scanned image data in the USB memory after the scanned image data is stored in memory 42 while the error occurs in retaining (storing) the scanned data in the USB memory (error in writing data).

In this case, in the error state in which the error occurs in tentatively storing the scanned image data in memory 42 while the error occurs in retaining (storing) the scanned data in the USB memory (error in pre-writing data), because the access to the USB memory is not performed yet, the actual access is not being performed (absence of actual access). The error state in which the error occurs in retaining (storing) the scanned image data in the USB memory after the scanned image data is stored in memory 42 is in an actual access (presence of actual access).

In view of the possibility of accessing the USB memory, in the error state in which the error occurs in tentatively storing the scanned image data in memory 42 while the error occurs in retaining (storing) the scanned data in the USB memory (error in pre-writing data), because access to the USB memory will be made to perform data write after the error state is eliminated, the possibility of accessing the USB memory exists (presence of the possibility of accessing the USB memory). On the other hand, because the error state in which the error occurs in retaining (storing) the scanned image data in the USB memory after the scanned image data is stored in memory 42 (error in writing data) is a data writing state, the possibility of accessing the USB memory exists (presence of the possibility of accessing the USB memory).

The case in which a job is not performed (suspended job) can further be classified into four states.

Specifically, the suspended job can be classified into two states base on the presence or absence of at least one performance history of the USB memory print function (data read) or USB memory scan function (data write) in the past histories.

The suspended job can be classified into two based on whether under user authentication. In this case, because a job is not performed (suspended job), actual access to the USB memory is made (absence of actual access).

In view of the possibility of accessing the USB memory, in the case where it is under user authentication, the possibility of accessing the USB memory exists (presence of the possibility of accessing the USB memory). On the other hand, in the case where user authentication is not performed, i.e., in the case of the user logout, there is low possibility of accessing the USB memory (absence of the possibility of accessing the USB memory).

The ranking is performed based on the above-described contents.

Specifically, when the USB memory is attached to the USB connector, in the state in which the user logs out while a job is not performed (suspended job), it is though that auto reset takes place because panel manipulation is not performed for a predetermined period of time. Accordingly, actual access is not made and the USB memory is probably left as it is, so that rank 2 next to rank 1 is set in this case.

Then, when the USB memory is attached to the USB connector, in the state in which a job is running while the data stored in the USB memory is stored in memory 42 (data-read completed state), or in the error state generated in printing the data after the data stored in the USB memory is stored in memory 42 (error after completion of data read), actual access is ended, and the data is already stored in memory 42. Therefore, there is low possibility of accessing the USB memory, so that rank 3 is set in this case.

Then, when the USB memory is attached to the USB connector, in the state in which user authentication is being performed while a job is not running (suspended job), there is a possibility of getting actual access from here on although no actual access is currently made, so that rank 4 next to rank 3 is set in this case.

Then, when the USB memory is attached to the USB connector, and when a job is running, the state in which scanned image data is tentatively stored in memory 42 while the scanned data is retained (stored) in the USB memory or the error state that occurs at the stage where the scanned image data is tentatively stored in memory 42 while the scanned data is retained (stored) in the USB memory (error in pre-writing data) is not an actual access state because the access to the USB memory is not made yet (absence of actual access). However, there is a high possibility of accessing the USB memory next, so that rank 5 next to rank 4 is set in this case.

Then, when the USB memory is attached to the USB connector, in the state in which actual access is made while a job is running, the USB memory cannot be extracted and inserted (extraction and insertion are not permitted), so that rank 6 is set in this case.

Specifically, for the USB memory print function, the case in which the extraction and insertion are not permitted corresponds to the state in which the data stored in the USB memory is tentatively stored in memory 42 while the data read from the USB memory is printed (data reading state) or the error state that occurs at the stage where the data stored in the USB memory is tentatively stored in memory 42 while the data read from the USB memory is printed (error in reading data). For the USB memory scan function, the case in which the extraction and insertion are not permitted corresponds to the state in which the scanned image data stored in memory 42 is retained (stored) in the USB memory (data writing state) or the error state that occurs at the stage where the scanned image data is retained (stored) in the USB memory after stored in memory 42 (error in writing data).

Thus, the twelve states of the USB memory are classified into ranks 2 to 6 as described above.

Similarly, the case of USB HDD will be described below. With the USB memory print function and USB memory scan function corresponding to the USB memory, similar processing can be performed on the USB HDD. In the present embodiment, the USB HDD function corresponding to the USB memory print function of the USB memory is referred to as a USB HDD print function. The USB HDD function corresponding to the USB memory scan function is referred to as a USB HDD scan function.

As described above, the state of the USB HDD can be classified into the state in which a job is being performed (running job) and the state in which a job is not performed (suspended job).

Regarding the USB HDD, the running job can be classified into the case in which the USB HDD print function is performed and the case in which the USB HDD scan function is performed.

Specifically, in the case where the USB HDD print function is performed, the running job can further be classified into four states.

Specifically, the running job can be classified into a state in which the data stored in the USB HDD is tentatively stored in memory 42 while the data read from the USB HDD which is the USB HDD print function is printed (data reading state) and a state in which the data stored in the USB HDD is stored in memory 42 while the data read from the USB HDD is printed (data-read completed state).

In this case, the state in which the data stored in the USB HDD is tentatively stored in memory 42 (data reading state) is in an actual access (presence of actual access). In the state in which the data stored in the USB HDD is stored in memory 42 (data-read completed state), because the data is already stored in memory 42, the actual access is ended (absence of actual access).

In view of the possibility of accessing the USB HDD, because the state in which the data stored in the USB HDD is tentatively stored in memory 42 (data reading state) is a data reading state, the possibility of accessing the USB HDD exists (presence of the possibility of accessing the USB HDD). On the other hand, in the state in which the data stored in the USB HDD is stored in memory 42 (data-read completed state), because the data is already stored in memory 42, there is low possibility of accessing the USB HDD (absence of the possibility of accessing the USB HDD).

The running job can be classified into an error state in which an error occurs in tentatively storing the data stored in the USB HDD in memory 42 while the error occurs in printing the data read from the USB HDD which is the USB HDD print function (error in reading data) and an error state in which an error occurs in printing the data stored in the USB HDD after the data is stored in memory 42 while the error occurs in printing the data read from the USB HDD (error after completion of data read).

In this case, the error state in which the error occurs in tentatively storing the data stored in the USB HDD in memory 42 (error in reading data) is in an actual access (presence of actual access). In the error state in which the error occurs in printing the data stored in the USB HDD after the data is stored in memory 42 (error after completion of data read), because the data is already stored in memory 42, the actual access is ended (absence of actual access).

In view of the possibility of accessing the USB HDD, because the error state in which the error occurs in storing the data stored in the USB HDD in memory 42 (error in reading data) is a data reading state, the possibility of accessing the USB HDD exists (presence of the possibility of accessing the USB HDD). On the other hand, in the error state in which the error occurs in printing the data stored in the USB HDD after the data is stored in memory 42 (error after completion of data read), because the data is already stored in memory 42, there is low possibility of accessing the USB HDD (absence of the possibility of accessing the USB HDD).

Similarly, in the case where the USB HDD scan function is performed, the running job can further be classified into four states.

Specifically, the running job can be classified into a state in which the scanned image data is tentatively stored in memory 42 while the scanned data is retained (stored) in the USB HDD which is the USB HDD scan function (data pre-writing state) and a state in which the image data stored in memory 42 is retained (stored) in the USB HDD while the scanned data is retained (stored) in the USB HDD (data writing state).

In the state in which the scanned image data is tentatively stored in memory 42 while the scanned data is being retained (stored) in the USB HDD (data pre-writing state), because an access to the USB HDD is not made yet, the actual access is not being made (absence of actual access). On the other hand, the state in which the image data stored in memory 42 is retained (stored) in the USB HDD while the scanned data is retained (stored) in the USB HDD (data writing state) is in an actual access (presence of actual access).

In view of the possibility of accessing the USB HDD, in the state in which the scanned image data is tentatively stored in memory 42 while the scanned data is retained (stored) in the USB HDD (data pre-writing state), because an access to the USB HDD is to be made next to perform data write, the possibility of accessing the USB HDD exists (presence of the possibility of accessing the USB HDD). On the other hand, because the state in which the image data stored in memory 42 is retained (stored) in the USB HDD (data writing state) is a data writing state, the possibility of accessing the USB HDD exists (presence of the possibility of accessing the USB HDD).

The running job can be classified into an error state in which an error occurs in tentatively storing the scanned image data in memory 42 while the error occurs in retaining (storing) the scanned data in the USB HDD which is the USB HDD scan function (error in pre-writing data) and an error state in which an error occurs in retaining (storing) the scanned image data in the USB HDD after the scanned image data is stored in memory 42 while the error occurs in retaining (storing) the scanned data in the USB HDD (error in writing data).

In this case, in the error state in which the error occurs in tentatively storing the scanned image data in memory 42 while the error occurs in retaining (storing) the scanned data in the USB HDD (error in pre-writing data), because an access to the USB HDD is not made yet, an actual access is not being made (absence of actual access). The error state in which the error occurs in retaining (storing) the scanned image data in the USB HDD after the scanned image data is stored in memory 42 is in an actual access (presence of actual access).

In view of the possibility of accessing the USB HDD, in the error state in which the error occurs in tentatively storing the scanned image data in memory 42 while the error occurs in retaining (storing) the scanned data in the USB HDD (error in pre-writing data), because an access to the USB HDD is to be made next to perform data write after the error state is eliminated, the possibility of accessing the USB HDD exists (presence of the possibility of accessing the USB HDD). On the other hand, because the error state in which the error occurs in retaining (storing) the scanned image data in the USB HDD after the scanned image data is stored in memory 42 (error in writing data) is a data writing state, the possibility of accessing the USB HDD exists (presence of the possibility of accessing the USB HDD).

The case in which a job is not performed (suspended job) can further be classified into four states.

Specifically, the suspended job can be classified into two states base on the presence or absence of at least one performance history of the USB HDD print function (data read) or USB HDD scan function (data write) in the past histories.

The suspended job can be classified into two based on whether under user authentication.

In this case, because a job is not performed (suspended job), an actual access to the USB HDD is not made (absence of actual access).

In view of the possibility of accessing the USB HDD, in the case where user authentication is being performed, the possibility of accessing the USB HDD exists (presence of the possibility of accessing the USB HDD). On the other hand, in the case where user authentication is not performed, i.e., in the case of user logout, there is low possibility of accessing the USB HDD (absence of the possibility of accessing the USB HDD).

That is, the twelve states of USB HDD are classified into ranks 2 to 6 according to the same method as the USB memory described above.

Referring to FIG. 5, a control flow performed by panel control part 70 to display priority of the USB memory device based on information from USB memory device status management part 65 will be described.

Referring to FIG. 5, it is determined whether or not the USB display icon button is pressed (Step S1), and if so determined, the process proceeds to the next step. As described above, the control flow is performed by pressing USB display icon button 214 of FIG. 3 as described above.

Then, the USB device status management table existing in USB device status management part 65 is referenced (Step S2).

Referring to FIG. 6, an example of the USB device status management table will be described.

Referring to FIG. 6, fields of USB connector numbers CN1 to CN6 corresponding to USB connectors 20 to 25 are provided. "Instrument type", "authentication state/usage state", "job state", and "rank" which is for ranking determination results are displayed according to the items of the USB connector numbers. In FIG. 6, "rank" is displayed, but the field of "rank" may be provided or not particularly provided.

Specifically, in the present embodiment, the information indicating which of the USB memory, the USB HDD, and the authentication device is the type of USB device attached to the USB connector is stored in "instrument type" based on detection information on the attached instrument. The detection information is outputted from USB device connection part 5.

The information indicating whether or not user authentication is performed is stored in "authentication state/usage state" based on authentication information from login/logout management part 27, when the attached USB device is one of the USB memory and the USB HDD. In the present embodiment, information indicating a user name and that it is under authentication is stored when the user authentication is already performed, and information indicating in-use or unused is stored when the USB device is the authentication device.

Information on the USB device job state outputted from job control part 50 is stored in "job state" when a job is performed on the USB device.

Specifically, in the present embodiment, it is assumed that the instrument type information indicating USB memory and the authentication state information indicating that a user D is under authentication are stored in USB connector number CN1, for example. It is also assumed that the job state information indicating the data reading state is stored in USB connector number CN1.

It is assumed that the instrument type information indicating USB HDD and the authentication state information indicating that a user A is under authentication are stored in USB connector member CN2. It is also assumed that the job state information indicating the data pre-writing state is stored in USB connector number CN2.

It is assumed that the instrument type information indicating USB memory and the authentication state information indicating that a user C is under authentication are stored in USB connector number CN3. It is also assumed that the job state information indicating the data-read completed state is stored in USB connector number CN3.

It is assumed that the instrument type information indicating USB HDD and the authentication state information indicating that a user B is under authentication are stored in USB connector number CN4. It is also assumed that the job state information indicating the idling state (suspended job) is stored in USB connector number CN4.

It is assumed that the instrument type information indicating USB memory and the authentication state information indicating unauthenticated (under user logout) are stored in USB connector number CN5.

It is assumed that the instrument type information indicating authentication device and the authentication state information indicating in use are stored in USB connector number CN6.

Referring to FIG. 5 again, ranking determination is made based on the information on the USB device status management table (Step S3).

Figure 7:
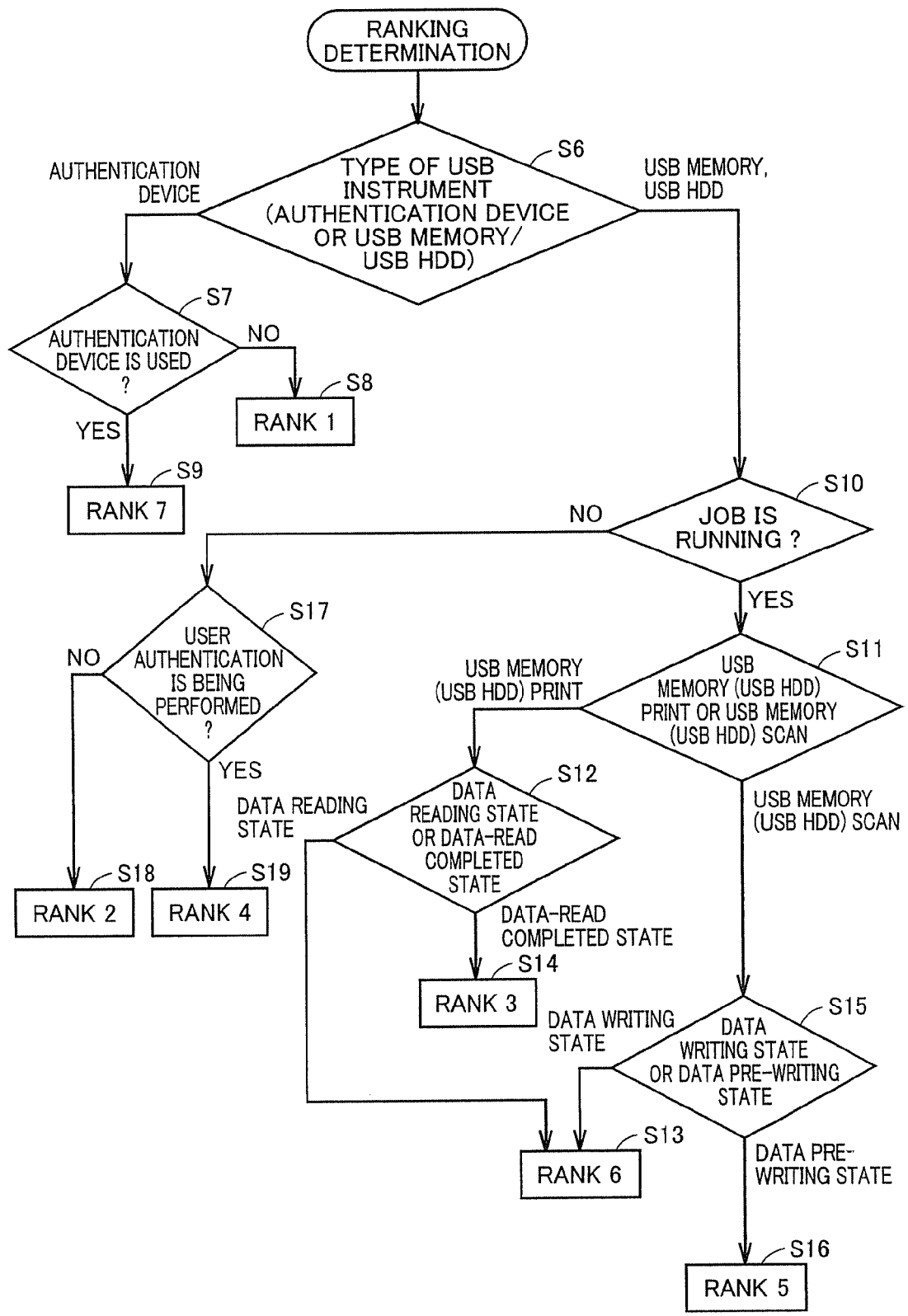
FIG. 7 is a flowchart for making ranking determination in the panel control part.

Referring to FIG. 7, a flow for making the ranking determination by panel control part 70 will be described.

Referring to FIG. 7, the type of the USB device (instrument) is first determined as the ranking determination processing (Step S6).

When the USB device is the authentication device, the process proceeds to Step S7. When the USB device is one of the USB memory and the USB HDD, the process proceeds to Step S10.

When it is determined that the USB device is the authentication device in Step S6, it is determined whether or not the authentication device is in use (Step S7).

When it is determined that the authentication device is in use in Step S7, rank 7 is set (Step S9). On the other hand, when it is determined that the authentication device is not used in Step S7, rank 1 is set (Step S8).

On the other hand, when it is determined that the USB device is one of the USB memory and the USB HDD in Step S6, it is determined next whether or not a job is being performed (Step S10).

The determination whether or not a job is being performed is made based on the job state described with reference to FIG. 6. The job is being performed when the job processing such as data reading state is stored. On the other hand, the job is suspended when the job state is set to the idling state.

When it is determined that the job is being performed in Step S10, the process proceeds to Step S11. On the other hand, when it is determined that the job is in the idling state, namely, the job is suspended, the process proceeds to Step S17.

When it is determined that the job is suspended in Step S10, it is determined next whether or not the user authentication is performed (Step S17).

When it is determined that the user authentication is performed, namely, the user logs-in in Step S17, the rank 4 is set (Step S19). On the other hand, when it is determined that the user is not authenticated, namely, the user logs-out, rank 2 is set (Step S18).

When it is determined that the job is being performed in Step S10, it is determined next whether the job is the USB memory (USB HDD) print or the USB memory (USB HDD) scan (Step S11). The determination whether the job is the USB memory (USB HDD) print or the USB memory (USB HDD) scan is made based on the job state described with reference to FIG. 6. It is determined that the job is the USB memory (USB HDD) print in the case of the data reading state and data-read completed state including the error state. On the other hand, it is determined that the job is the USB memory (USB HDD) scan in the case of the data writing state and data pre-writing state including the error state.

When it is determined that the job is the USB memory (USB HDD) print in Step S11, it is determined next whether the job state including the error state is the data reading state or the data-read completed state (Step S12).

When it is determined that the job state is the data reading state or the error in reading data in Step S12, rank 6 is set.

When it is determined that the job state is the data-read completed state or the error after completion of data read in Step S12, rank 3 is set.

On the other hand, when it is determined that the job is the USB memory (USB HDD) scan in Step S11, it is determined next whether the job state including the error state is the data writing state or the data pre-writing state (Step S15).

When it is determined that the job state is the data writing state or the error in writing data in Step S15, rank 6 is set.

When it is determined that the job state is the data pre-writing state or the error in pre-writing data in Step S15, rank 5 is set.

The above ranking determination made by referring to the USB device status management table of FIG. 6 will be described below.

As described above, the USB device attached to USB connector 20 (USB connector number CN1) is a USB memory as described above, and rank 6 is set because the job state is "data reading state". As described above, the USB device attached to USB connector 21 (USB connector number CN2) is a USB HDD, and rank 5 is set because the job state is "data pre-writing state". As described above, the USB device attached to USB connector 22 (USB connector number CN3) is a USB memory, and rank 3 is set because the job state is "data-read completed state". As described above, the USB device attached to USB connector 23 (USB connector number CN4) is a USB HDD, and the user is under authentication. Also, rank 4 is set because the job state is "idling state (suspended job)". As described above, the USB device attached to USB connector 24 (USB connector number CN5) is a USB memory, and the user is not authenticated. Also, rank 2 is set because the job state is "idling state (suspended job)". As described above, the USB device attached to USB connector 25 (USB connector number CN6) is an authentication device, and rank 7 is set because the authentication device is in use.

Referring to FIG. 5 again, after the ranking determination in Step S3, priority is set next based on the ranking determination result (Step S4). Specifically, first priority is set to the rank having the smallest numerical value of the ranking determination result. Second priority is set to the rank having the second-smallest numerical value. The priority is similarly set subsequently in the descending manner based on the numerical value of the ranking determination result. In a case where a plurality of ranks have the same ranking determination result, the same priority can be set to the ranks, or a time during which the USB device is attached or the like can be measured to set different orders of priority to the ranks based on the measured time corresponding to each USB connector number.

Then, a USB device priority screen is displayed on manipulation display 12 of manipulation panel part 10 (Step S5).

Specifically, the priority based on the ranking result is displayed for the USB devices attached to the corresponding USB connectors described above.

Figure 8:
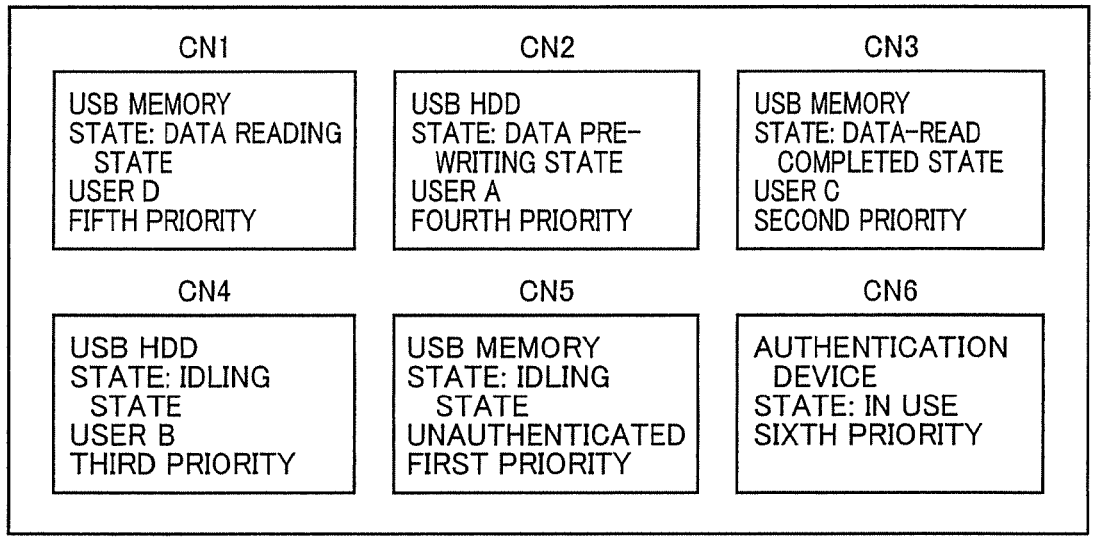
FIG. 8 is a diagram illustrating a USB device priority screen based on information in the USB device status management table of FIG. 6.

Referring to FIG. 8, the USB device priority screen based on the information in the USB device status management table of FIG. 6 will be described.

As shown in FIG. 8, the priority based on the ranking determination result is displayed along with the instrument type, job state, and authentication state of the USB devices attached to the connectors corresponding to the six USB connectors. Specifically, the USB memory corresponding to USB connector number CN5 has the first priority. The USB memory corresponding to USB connector number CN3 has the second priority. The USB HDD corresponding to USB connector number CN4 has the third priority. The USB HDD corresponding to USB connector number CN2 has the fourth priority. The USB memory corresponding to USB connector number CN1 has the fifth priority. The authentication device corresponding to USB connector number CN6 has the sixth priority.

Through the screen display, the user can recognize the priority of the USB devices attached to the USB connectors. For example, the user can judge that the USB device attached to USB connector 24 corresponding to USB connector number CN5 having high priority be preferentially extracted. Displaying the priority can prevent the user from mistakenly extract the USB device in access state.

In an MFP in which a plurality of jobs can be reserved and performed in a predetermined order, a USB memory can be attached to reserve a job. However, when a new job cannot be performed because connectors for the USB memories are occupied, the user cannot distinguish between the USB memory with which another person reserves a job and the USB memory with which a job is not reserved, e.g., the USB memory from which the data therein is already transferred to the MFP side. On the other hand, from the screen display of the present invention, it is clear who uses which USB memory, and the job state can be confirmed. Therefore, the user can easily find the USB memory which can be extracted.

Accordingly, a plurality of connectors to which USB devices are connectable can efficiently and effectively be used.

In the present embodiment, the order is displayed on the screen in order to enable the user to recognize the priority of each USB device attached to the USB connectors. However, the present invention is not particularly limited to this method as long as the user can recognize the priority. For example, the information on a preferentially-extractable USB device can be reported to the user by coloring or gradation in accordance with the priority, the preferentially-extractable USB device can be blinked, or the USB device which is not suitable to be preferentially extracted from the viewpoint of the rank can reversely be displayed.

Modification of First Embodiment

Figure 9:
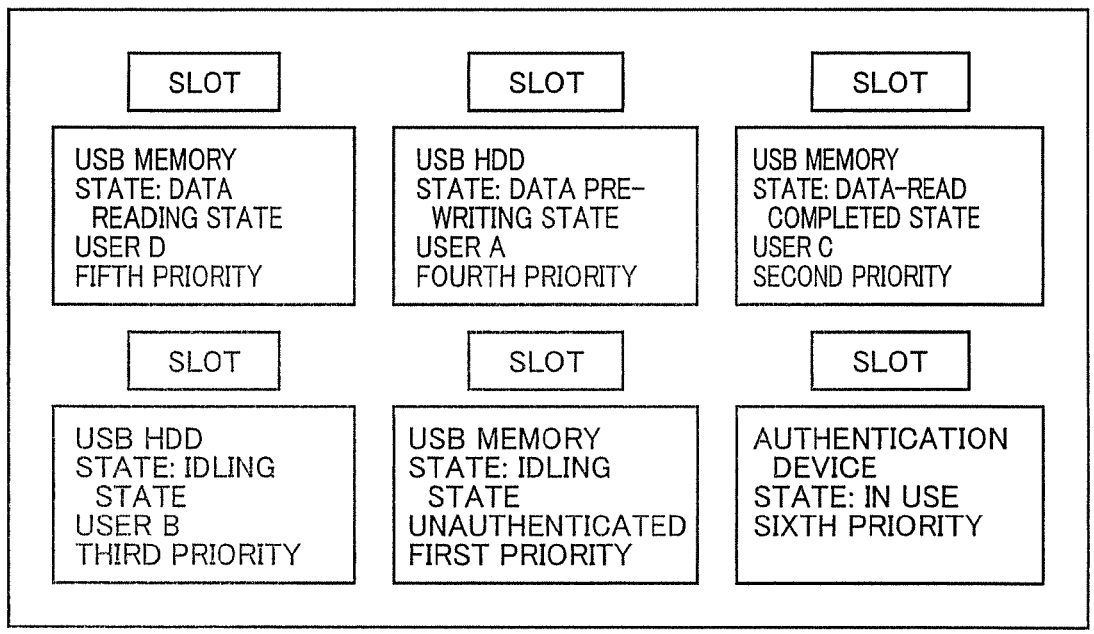
FIG. 9 is another diagram illustrating the USB device priority screen based on the information in the USB device status management table of FIG. 6.

Referring to FIG. 9, the USB device priority screen based on the information in the USB device status management table of FIG. 6 will be described below.

As shown in FIG. 9, the USB device priority screen is displayed along with a slot model of the USB connector according to shapes of the USB connectors 20 to 25 of FIG. 1, which allows the user to see at a glance which USB device attached to which USB connector in comparison with the configuration of the USB connector in MFP 1. Therefore, user-friendliness is improved. Additionally, the screen display can further prevent the user from mistakenly extracting the USB device in an access state.

Second Embodiment

In accordance with a second embodiment of the present invention, the case in which ranks 2 to 5 are further classified into sub-ranks to display the priority will be described.

Specifically, in the ranking determination (Step S3) of FIG. 5, sub-ranking determination is made in conjunction with the ranking determination processing of FIG. 7.

Figure 10:
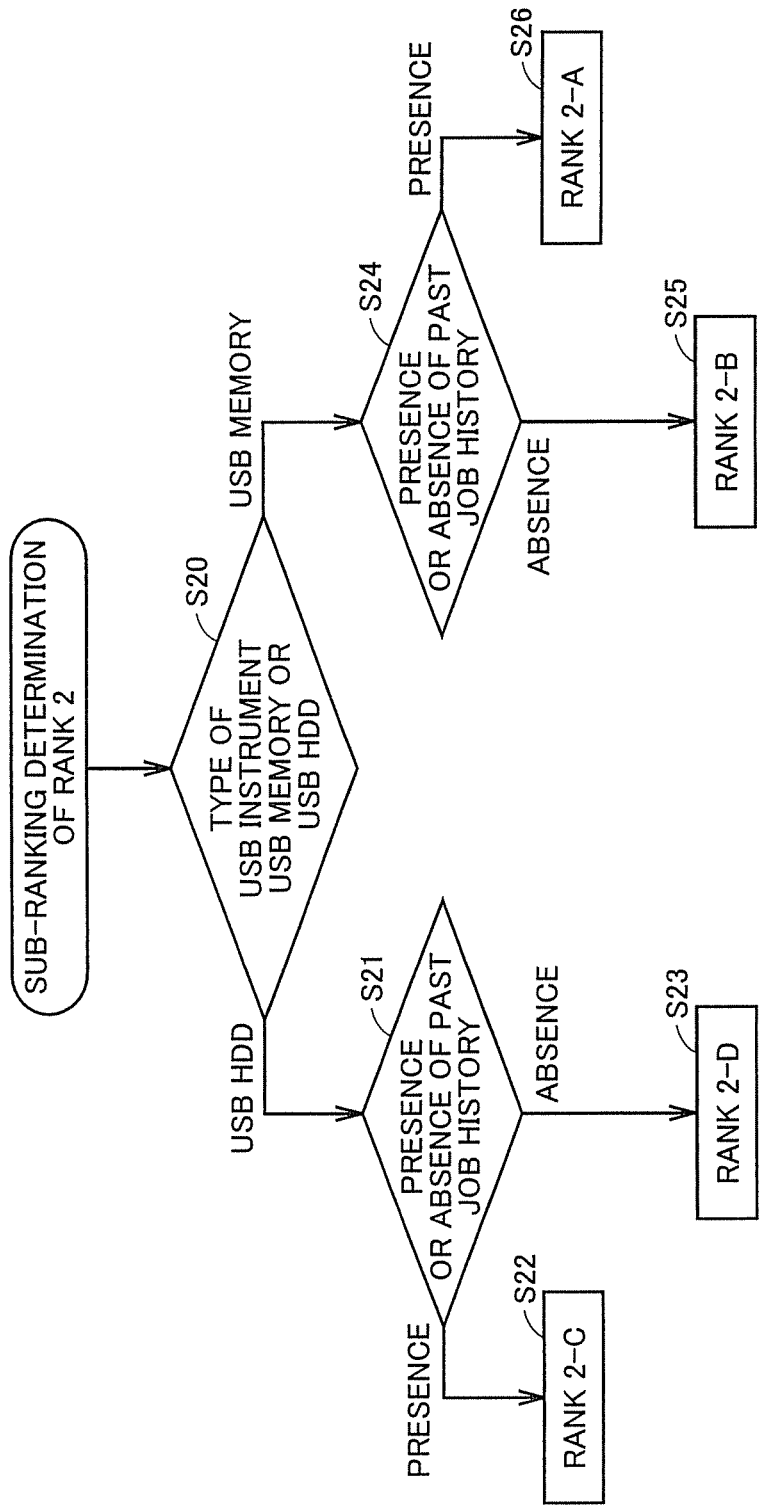
FIG. 10 is a flowchart for making sub-ranking determination of rank 2 according to a second embodiment of the present invention.

Referring to FIG. 10, a flow for making sub-ranking determination of rank 2 according to the second embodiment will be described below. Rank 2 corresponds to the user unauthenticated state in which the USB memory or USB HDD is in the idling state.

Referring to FIG. 10, determination of the instrument type of the USB device is made (Step S20). Specifically, it is determined whether the USB device is a USB memory or USB HDD.

When it is determined in Step S20 that the USB device is a USB memory, it is determined next whether or not a past job history exists (Step S24). When a past job history exists in Step S24, a rank 2-A is set (Step S26). On the other hand, when a past job history does not exist, a rank 2-B is set (Step S25).

When it is determined in Step S20 that the USB device is a USB HDD, it is determined next whether or not a past job history exists (Step S21). When a past job history exists in Step S21, a rank 2-C is set (Step S22). On the other hand, when a past job history does not exist, a rank 2-D is set (Step S23).

In ranks 2-A to 2-D, rank 2-A has the highest priority, and rank 2-B, rank 2-C, and rank 2-D have the priorities in the descending order.

It is thought that usually a USB HDD is frequently used as a shared resource by a plurality of users while USB memories are possessed by individuals in many cases. Accordingly, USB HDDs are lower in frequency of extraction than USB memories and are highly possibly used as fixed devices, so that lower priority is set to USB HDDs compared with USB memories.

When a USB device has a past job history, the USB device has already been used once, and therefore it is thought that a USB device which has not been used is more likely to be used than the USB device that has already been used once. Therefore, higher priority is set to the USB device that has already been used once.

Figure 11:
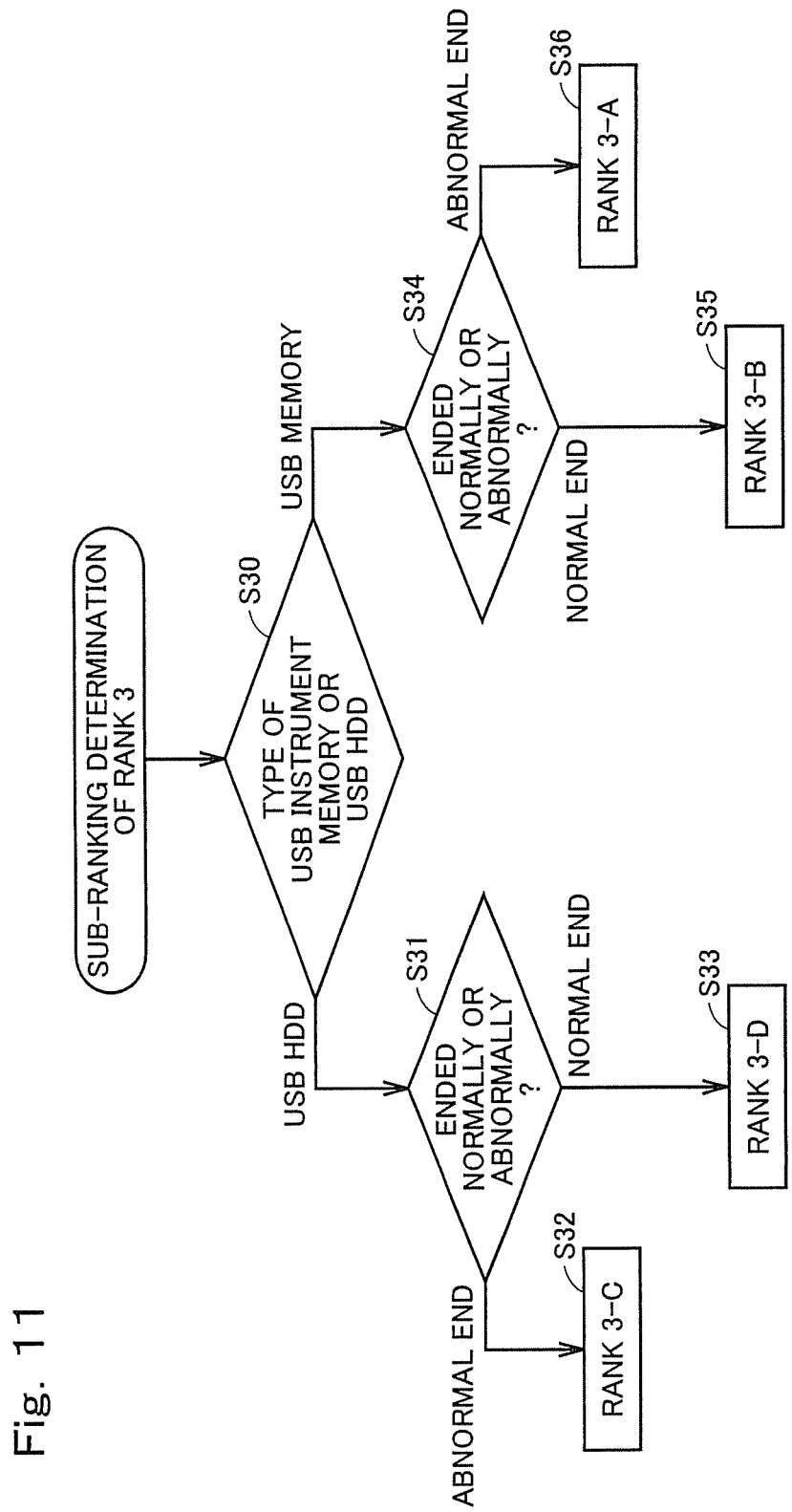
FIG. 11 is a flowchart for making sub-ranking determination of rank 3 according to the second embodiment of the present invention.

Referring to FIG. 11, a flow for making sub-ranking determination of rank 3 according to the second embodiment will be described below. Rank 3 corresponds to the job state in which the USB memory or USB HDD is in the data-read completed state including the error state of the USB memory (USB HDD) print function.

Referring to FIG. 11, determination of the instrument type of the USB device is first made (Step S30). Specifically, it is determined whether the USB device is a USB memory or USB HDD.

When it is determined in Step S30 that the USB device is a USB memory, it is determined whether the USB memory is ended normally or abnormally (Step S34). When the USB memory is abnormally ended due to an error in Step S34, a rank 3-A is set (Step S36). On the other hand, when the USB memory is normally ended, a rank 3-B is set (Step S35).

When it is determined in Step S30 that the USB device is a USB HDD, it is determined whether the USB HDD is ended normally or abnormally (Step S31). When the USB HDD is abnormally ended due to an error in Step S31, a rank 3-C is set (Step S32). On the other hand, when the USB HDD is normally ended, a rank 3-D is set (Step S33).

As described above, USB HDDs are lower in frequency of extraction than USB memories and are highly possibly used as fixed devices, so that lower priority is set to USB HDDs compared with USB memories.

It is thought that a USB device which is normally ended is more likely to be used further than a USB device which is abnormally ended due to an error. Therefore, higher priority is set to USB devices which are abnormally ended due to errors.

Figure 12:
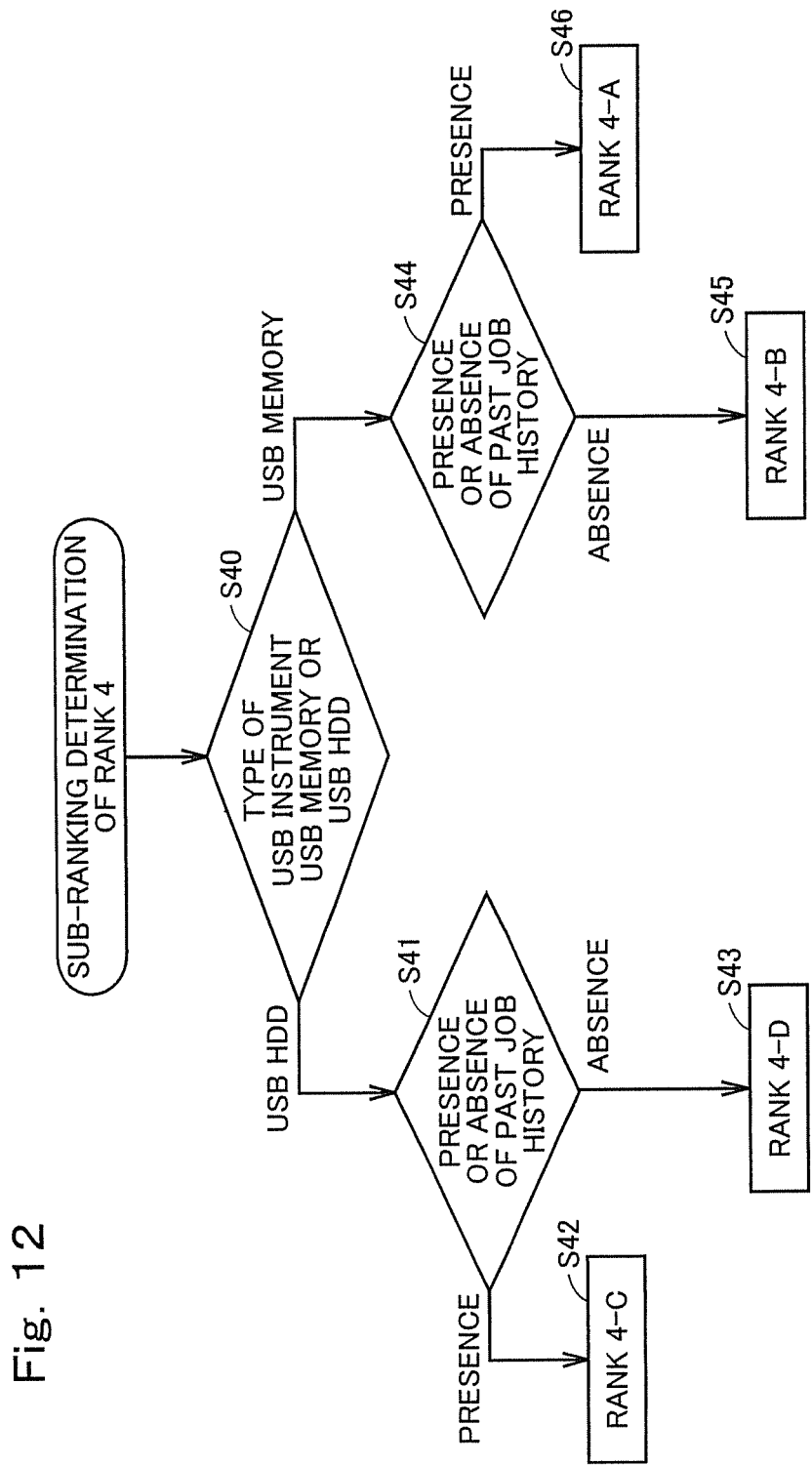
FIG. 12 is a flowchart for making sub-ranking determination of rank 4 according to the second embodiment of the present invention.

Referring to FIG. 12, a flow for making sub-ranking determination of rank 4 according to the second embodiment will be described below. Rank 4 corresponds to the user authentication state in which the USB memory or USB HDD is in the idling state.

Referring to FIG. 12, determination of the instrument type of the USB device is made (Step S40). Specifically, it is determined whether the USB device is a USB memory or USB HDD.

When it is determined in Step S40 that the USB device is a USB memory, it is determined next whether or not a past job history exists (Step S44). When a past job history exists in Step S44, a rank 4-A is set (Step S46). On the other hand, when a past job history does not exist, a rank 4-B is set (Step S45).

When it is determined in Step S40 that the USB device is a USB HDD, it is determined next whether or not a past job history exists (Step S41). When a past job history exists in Step S41, a rank 4-C is set (Step S42). On the other hand, when a past job history does not exist, a rank 4-D is set (Step S43).

In ranks 4-A to 4-D, rank 4-A has the highest priority, and rank 4-B, rank 4-C, and rank 4-D have the priorities in the descending order.

As described above, USB HDDs are lower in frequency of extraction than USB memories, and USB HDDs are highly possibly used as fixed devices, so that lower priority is set to USB HDDs compared with USB memories.

As described above, when the USB device has a past job history, the USB device has already been used once, and therefore, it is thought that the USB device which has not been used is more likely to be used than the USB device that has already been used once. Therefore, higher priority is set to the USB device that has already been used once.

Figure 13:
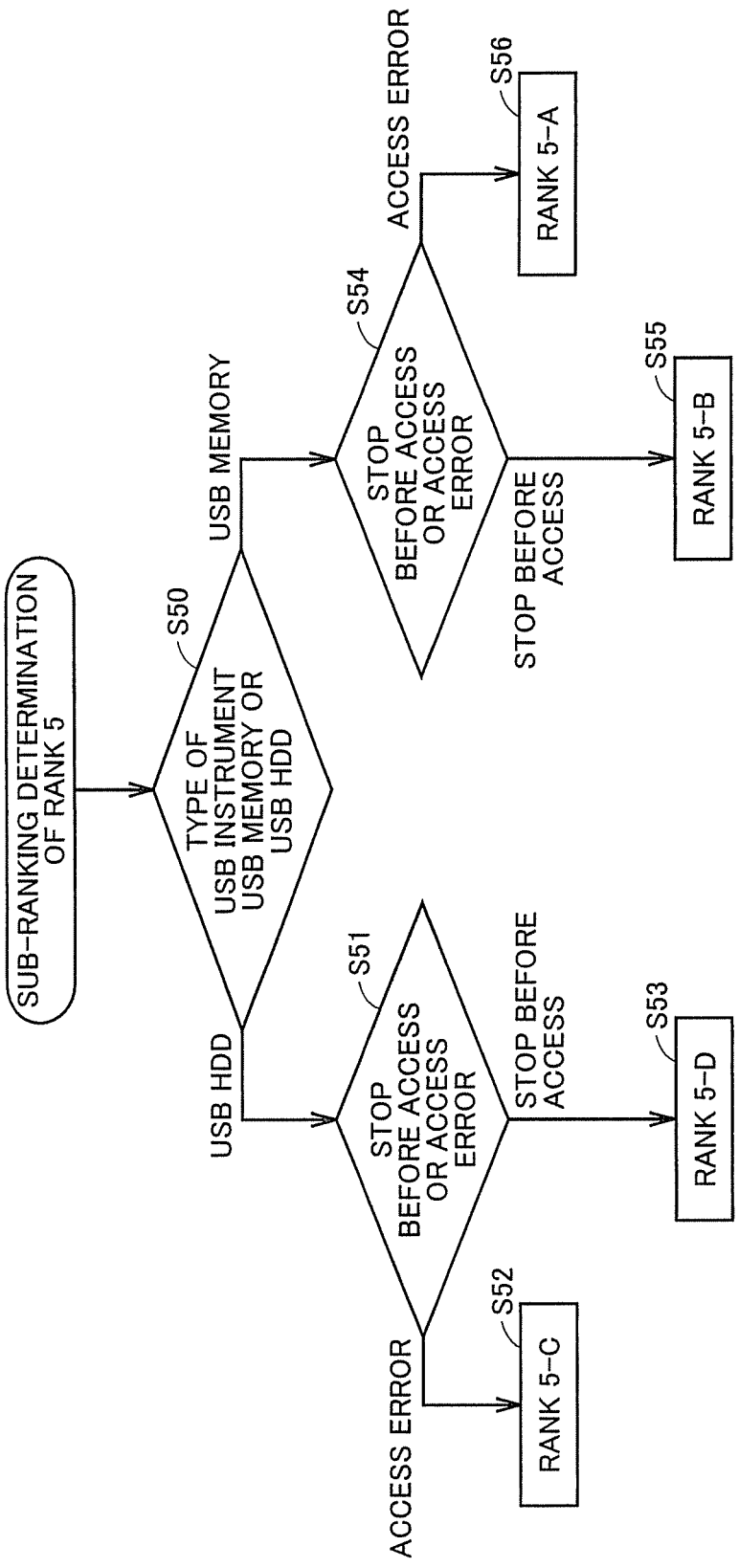
FIG. 13 is a flowchart for making sub-ranking determination of rank 5 according to the second embodiment of the present invention.

Referring to FIG. 13, a flow for making sub-ranking determination of rank 5 according to the second embodiment will be described below. Rank 5 corresponds to the job state in which a USB memory or USB HDD is in the data pre-writing state including the error state of the USB memory (USB HDD) scan function.

Referring to FIG. 13, determination of the instrument type of the USB device is made (Step S50). Specifically, it is determined whether the USB device is a USB memory or USB HDD.

When it is determined in Step S50 that the USB device is a USB memory, it is determined whether the USB memory is in the data pre-writing state, specifically in the state in which the USB memory is stopped before access or the USB memory is in the error in writing data, specifically in the access error state (Step S54). When the USB memory is in the access error state in Step S54, a rank 5-A is set (Step S56). On the other hand, when the USB memory is stopped before access, a rank 5-B is set (Step S55).

When it is determined in Step S50 that the USB device is a USB HDD, it is determined whether the USB HDD is in the data pre-writing state, specifically in the state in which the USB HDD is stopped before access or the USB HDD is in the state in which an error occurs in writing data, specifically in the access error state (Step S51). When the USB HDD is in the access error state in Step S51, a rank 5-C is set (Step S52). On the other hand, when the USB HDD is stopped before access, a rank 5-D is set (Step S53).

As described above, USB HDDs are lower in frequency of extraction than USB memories and are highly possibly used as fixed devices, so that lower priority is set to USB HDDs compared with USB memories.

The state in which the USB device is stopped before access, i.e., the data pre-writing state is the case in which the USB device is next accessed to perform data write, so that lower priority is set to the USB device compared with the USB device in which an error occurs in writing data.

Referring to FIG. 14, another example of the USB device status management table will be described. Referring to FIG. 14, the USB device status management table of FIG. 14 differs from the USB device status management table of FIG. 6 in that the job state of the field corresponding to USB connector number CN2 is stored as the data-read completed state. Other configurations are similar to the example described with reference to FIG. 6.

In accordance with the flowchart for performing the ranking determination of FIG. 7, as described above, the USB device attached to USB connector 21 (USB connector number CN2) is a USB HDD, and the job state is in the "data-read completed state". Therefore, rank 3 is set. Accordingly, the USB HDD attached to USB connector 21 (USB connector number CN2) has the same rank as that of the USB device attached to USB connector 22 (USB connector number CN3).

The sub-ranking determination of rank 3 is made using the flowchart of FIG. 11.

Referring to FIG. 11, it is determined whether the instrument type regarding USB connector number CN2 is USB memory or USB HDD. Because the instrument type is USB HDD, the process proceeds to Step S31. Because the USB HDD is not abnormally ended due to an error but normally ended after completion of data read in Step S31, the process proceeds to Step S33, and rank 3-D is set.

On the other hand, it is determined whether the instrument type regarding USB connector number CN3 is USB memory or USB HDD. Because the instrument type of USB connector number CN3 is USB memory, the process proceeds to Step S34. Because the USB memory is not abnormally ended due to an error but normally ended after completion of data read in Step S34, the process proceeds to Step S35, and rank 3-B is set.

Accordingly, rank 3 is classified into the sub-ranks, and lower priority is set to USB connector number CN2 compared with the priority of USB connector number CN3.

Referring to FIG. 15, the USB device priority screen based on the information in the USB device status management table of FIG. 14 will be described.

As shown in FIG. 15, the priority based on the above ranking determination result is displayed along with the instrument type, job state, and authentication state of the USB devices attached to the connectors corresponding to the six USB connectors. Specifically, the USB memory corresponding to USB connector number CN5 has the first priority. The USB memory corresponding to USB connector number CN3 has the second priority. The USB HDD corresponding to USB connector number CN2 has the third priority. The USB HDD corresponding to USB connector number CN4 has the fourth priority. The USB memory corresponding to the USB connector number CN1 has the fifth priority. The authentication device corresponding to USB connector number CN6 has the sixth priority.

The user can recognize the priority of the USB devices attached to the USB connectors from the screen display. For example, the user can judge that the USB device attached to USB connector 24 corresponding to USB connector number CN5 having the highest priority be preferentially extracted. Then, the user can judge that the USB device attached to USB connector 22 corresponding to USB connector number CN3 having the second highest priority be extracted as the next candidate.

The sub-ranking determination of rank 3 is described here as a specific example. With regards to the sub-ranking determination of other ranks, ranks can be set in a similar manner.

In the first embodiment, the USB device is classified into the six ranks of ranks 1 to 6. According to the method of the second embodiment, the ranks can further be classified into sub-ranks, so that the ranking can be carried out in more detail, and highly accurate ranking can be performed. Therefore, as compared with the method of the first embodiment, the USB device having higher priority can preferentially be extracted more efficiently and effectively.

Modification of Second Embodiment

In the above-described second embodiment, ranks 2 to 5 are further classified into sub-ranks to display priority. In a modification of the second embodiment, the case in which rank 6 is classified into sub-ranks will be described.

Figure 16:
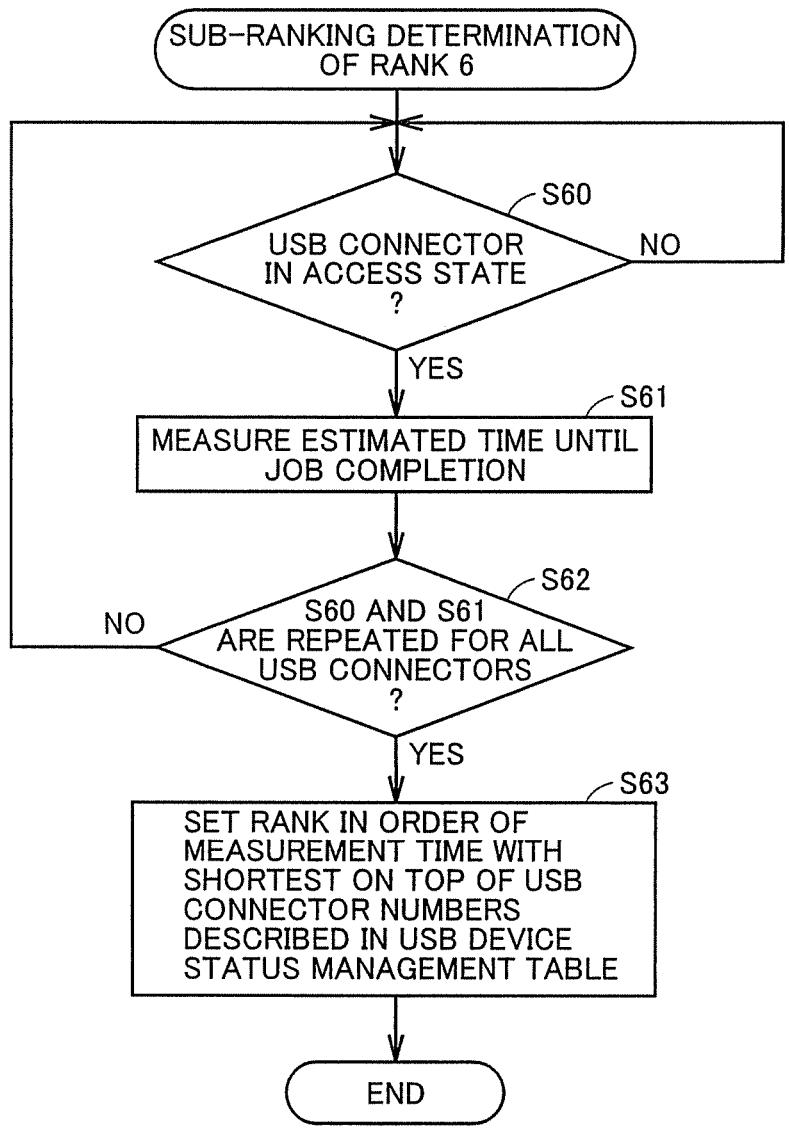
FIG. 16 is a flowchart for making sub-ranking determination of rank 6 according to a modification of the second embodiment of the present invention.

Referring to FIG. 16, a flow for performing the sub-ranking determination of rank 6 according to the modification of the second embodiment will be described below.

Referring to FIG. 16, it is determined whether or not the USB connector is in the access state to which rank 6 is set (Step S60). Specifically, it is determined whether the job state of the USB device attached to the USB connector is the data reading state or the data writing state, including the error state.

Then, an estimated time until the completion of the job is measured (Step S61). For example, in the case of, e.g., the USB memory (USB HDD) print, the estimated time until the completion of the job is measured based on the type of file format and the size of the data which is possessed as job information by job control part 50 and stored in the USB memory (USB HDD). In the case of, e.g., the USB memory (USB HDD) scan, the estimated time until the completion of the job is measured based on the number of scanned documents, the scan resolution and the like, which are possessed as job information by job control part 50.

Then, the above-described processes in Steps S60 and S61 are repeated for all the USB connectors. When the processes are repeated for all the USB connectors in Step S62, ranks are set in the ascending order of the above measurement time in the USB connector members provided in the USB device status management table (Step S63).

Specifically, among the USB connector numbers set to rank 6, the USB connector number having a shorter measurement time is set to a smaller rank than that of the USB connector number having a longer measurement time.

According to the method of the modification of the second embodiment, rank 6 is further classified into the sub-ranks, so that the detailed ranking can be performed with high accuracy. Therefore, as compared with the first embodiment, the USB device having higher priority can preferentially be extracted more efficiently and effectively.

In the above, only the case in which the priority is displayed has been described. Alternatively, for example, the above measured estimated time may be displayed for the USB device set to rank 6. Therefore, the user can recognize when the job of the USB device attached to the USB connector in the access state is completed, and the user can judge how long the user should wait until it become possible for the user to extract the USB device and insert a newly attached USB device.

In the embodiments, USB memories and USB HDDs are described as examples of the information recording device. However, the present invention can similarly be applied to other USB information recording devices.

In the embodiments, a USB finger-print authentication device is described as an example of the authentication device. However, the present invention is not particularly limited thereto and can also be applied to other authentication devices.

Although an MFP in which six connectors are provided as USB connectors is described in the embodiments, the present invention is not particularly limited to the number of connectors as long as more than one connectors are provided.

The image forming apparatus according to the present invention is not limited to an MFP, but may be a printer, a facsimile, and the like. For the controller which controls the image forming apparatus, a program for causing a computer to function and perform the control described above with reference to the flowcharts can also be provided. Such programs can be provided as a program product recorded in a computer-readable recording medium such as a flexible disk, a CD-ROM (Compact Disk-Read Only Memory), a ROM (Read Only Memory), and a RAM (Random Access Memory) which are attached to the computer or a memory card. Alternatively, the program can be provided while being recorded in a recording medium such as a hard disk incorporated into the computer. The program can also be provided by downloading the program over a network.

The program according to the present invention may invoke necessary modules in a predetermined array at a predetermined timing to perform the processing, among program modules provided as part of an operation system (OS) of the computer. In such cases, the modules are not contained in the program itself, and the processing is performed in conjunction with the OS. The program according to the present invention may include such a program that does not include any modules.

The program according the present invention may be provided while being incorporated in part of another program. In such cases, the modules contained in the another program are not included in the program itself, and the processing is performed in conjunction with the another program. The program according to the present invention may include such a program incorporated into another program.

The provided program product is executed by installing the program in a program storage part such as a hard disk. The program product includes the program itself and the recording medium in which the program is recorded.

In the embodiments, USB memories are described as an example of the detachable storage device. However, the present invention is not particularly limited to the USB memory and can also be applied to other auxiliary storage devices such as an SD (Secure Digital) card.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
a plurality of connectors to which a plurality of detachable devices can be attached;
a state management part that manages a plurality of states of each detachable device attached to said plurality of connectors, wherein each state of a detachable device is classified into a respective rank;
a control part configured to
display, on a display device, an icon corresponding to the detachable device for user selection,
upon selection of said icon corresponding to the detachable device, determine, based on the plurality of ranked states of each respective detachable device, an extraction priority order that identifies an order in which each detachable device from the plurality of detachable devices attached to said plurality of connectors may be disconnected with respect to one another, and
displays, on the display device, the extraction priority order.

2. The image forming apparatus according to claim 1, further comprising:
a detection part that manages connection statuses of the detachable devices attached to said plurality of connectors when each connector from the plurality of connectors is connected to a detachable device from the detachable devices according to a detection result from said detection part.

3. The image forming apparatus according to claim 1, further comprising:

an authentication part that performs authentication processing of a user, wherein said control part displays, on said display device, which of the detachable devices among said plurality of detachable devices attached to said plurality of connectors can be detached from said plurality of connectors based on the state management information in said state management part in response to an authentication result of said authentication part.

4. The image forming apparatus according to claim 3, wherein
said state management part manages authentication results for the detachable devices attached to said plurality of connectors, and
said control part gives lower extraction priority to a detachable device in an authentication state than that of a detachable device not in the authentication state based on state management information including the authentication states of the detachable devices attached to said plurality of connectors.

5. The image forming apparatus according to claim 1, wherein
said state management part manages access states for the detachable devices attached to said plurality of connectors, and
said control part gives lower extraction priority to a detachable device in the access state rather than a detachable device not in the access state based on state management information including the access states of the detachable devices attached to said plurality of connectors.

6. The image forming apparatus according to claim 5, wherein
said control part measures an estimated time until access is completed for the detachable device in the access state among the detachable devices attached to said plurality of connectors, and
said control part displays extraction priority for the detachable device in the access state based on the measured estimated time.

7. The image forming apparatus according to claim 5, further comprising:
a document scanning part that scans a document to generate electronic data; and
a write part that writes the electronic data generated by said document scanning part in said detachable devices, wherein said access state corresponds to an operation state in which the electronic data generated by said document scanning part is written in said detachable devices.

8. The image forming apparatus according to claim 5, further comprising:
a read part that reads electronic data from said detachable devices; and
a printing part that prints the read electronic data, wherein said access state corresponds to an operation state in which said electronic data is read from said detachable devices to print said electronic data with said printing part.

9. The image forming apparatus according to claim 1, further comprising:
a document scanning part that scans a document to generate electronic data; and
a write part that writes the electronic data generated by said document scanning part in said detachable devices, wherein said control part includes:
a job control part that controls said document scanning part and said write part to perform a job to a detachable device specified among said plurality of detachable devices; and
a display control part that gives lower extraction priority to a detachable device in a job running state than that of a detachable device not in the job running state based on job running information included in state management information in said state management part.

10. The image forming apparatus according to claim 9, wherein said display control part measures an estimated time until access is completed for the detachable device in the access state among the detachable devices attached to said plurality of connectors, and
wherein said display control part displays, on said display device, extraction priority for the detachable device in the access state based on the measured estimated time.

11. The image forming apparatus according to claim 1, further comprising:
a read part that reads electronic data from said detachable devices; and
a printing part that prints the read electronic data, wherein said control part includes:
a job control part that controls said read part and said printing part to perform a job to a detachable device specified among said plurality of detachable devices; and
a display control part that gives lower extraction priority to a detachable device in a job running state than that of a detachable device not in the job running state based on job running information included in state management information in said state management part.

12. The image forming apparatus according to claim 11, wherein said display control part measures an estimated time until access is completed for the detachable device in the access state among the detachable devices attached to said plurality of connectors, and
wherein said display control part displays extraction priority for the detachable device in the access state based on the measured estimated time.

13. The image forming apparatus according to claim 1, wherein said plurality of detachable devices correspond to at least one of a USB memory and a USB HDD, and said control part performs display with lower extraction priority given to the USB HDD rather than the USB memory.

14. The image forming apparatus according to claim 1, wherein said plurality of states includes at least a device attachment state, a device job state, and an authentication state.

15. The image forming apparatus according to claim 1, wherein the plurality of detachable devices includes at least one of a plurality of detachable storage devices or a plurality of detachable authentication devices.

* * * * *